(12) United States Patent
Oehring et al.

(10) Patent No.: US 10,927,802 B2
(45) Date of Patent: *Feb. 23, 2021

(54) SYSTEM FOR FUELING ELECTRIC POWERED HYDRAULIC FRACTURING EQUIPMENT WITH MULTIPLE FUEL SOURCES

(71) Applicant: U.S. Well Services, LLC, Houston, TX (US)

(72) Inventors: Jared Oehring, Houston, TX (US); Brandon N. Hinderliter, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,772

(22) Filed: May 31, 2018

(65) Prior Publication Data

US 2018/0278124 A1     Sep. 27, 2018

Related U.S. Application Data

(63) Continuation of application No. 15/487,656, filed on Apr. 14, 2017, now Pat. No. 10,020,711, which is a
(Continued)

(51) Int. Cl.
*E21B 43/26* (2006.01)
*F02M 37/32* (2019.01)
(Continued)

(52) U.S. Cl.
CPC ............ *F02M 37/32* (2019.01); *E21B 43/26* (2013.01); *F02B 43/08* (2013.01); *F02B 43/10* (2013.01);
(Continued)

(58) Field of Classification Search
CPC ..................................................... E21B 43/26
See application file for complete search history.

(56) References Cited

U.S. PATENT DOCUMENTS 1,656,861 A    1/1928  Leonard
1,671,436 A    5/1928  Melott
(Continued)

FOREIGN PATENT DOCUMENTS

AU    2007340913    7/2008
AU    2011203353    7/2011
(Continued)

OTHER PUBLICATIONS

Canadian Office Action dated Mar. 2, 2018 in related Canadian Patent Application No. 2,833,711.
(Continued)

*Primary Examiner* — Kenneth L Thompson
(74) *Attorney, Agent, or Firm* — Hogan Lovells US LLP

(57) ABSTRACT

A hydraulic fracturing system for fracturing a subterranean formation is disclosed. In an embodiment, the system can include a plurality of electric pumps fluidly connected to a well associated with the subterranean formation and powered by at least one electric motor, and configured to pump fluid into a wellbore associated with the well at a high pressure; at least one generator electrically coupled to the plurality of electric pumps so as to generate electricity for use by the plurality of electric pumps; a gas compression system fluidly coupled to the at least one generator so as to provide fuel for use by the at least one generator; and a combustible fuel vaporization system gaseously coupled to the gas compression system so as to provide at least one of vaporized fuel or gasified fuel, or a combination thereof, to the gas compression system.

8 Claims, 6 Drawing Sheets

Related U.S. Application Data continuation-in-part of application No. 15/235,788, filed on Aug. 12, 2016, which is a continuation-in-part of application No. 15/202,085, filed on Jul. 5, 2016, now Pat. No. 10,337,308, which is a continuation of application No. 13/679,689, filed on Nov. 16, 2012, now Pat. No. 9,410,410.

(60) Provisional application No. 62/323,303, filed on Apr. 15, 2016.

(51) Int. Cl.

| | | |
|---|---|---|
| *F02B 43/08* | (2006.01) | |
| *F02B 43/10* | (2006.01) | |
| *F02B 63/04* | (2006.01) | |
| *H02P 21/00* | (2016.01) | |
| *H02K 7/18* | (2006.01) | |
| *F04B 17/03* | (2006.01) | |
| *F04B 35/04* | (2006.01) | |
| *F04B 47/02* | (2006.01) | |
| *F04B 49/20* | (2006.01) | |
| *H02P 29/024* | (2016.01) | |

(52) U.S. Cl.
CPC .............. *F02B 63/04* (2013.01); *F04B 17/03* (2013.01); *F04B 35/04* (2013.01); *F04B 47/02* (2013.01); *F04B 49/20* (2013.01); *H02K 7/1815* (2013.01); *H02K 7/1823* (2013.01); *H02P 21/00* (2013.01); *H02P 29/0241* (2016.02); *F02B 2043/103* (2013.01)

(56) References Cited

U.S. PATENT DOCUMENTS

| | | |
|---|---|---|
| 2,004,077 A | 6/1935 | McCartney |
| 2,183,364 A | 12/1939 | Bailey |
| 2,220,622 A | 11/1940 | Aitken |
| 2,248,051 A | 7/1941 | Armstrong |
| 2,389,328 A | 11/1945 | Stilwell |
| 2,407,796 A | 9/1946 | Page |
| 2,416,848 A | 3/1947 | Rothery |
| 2,610,741 A | 9/1952 | Schmid |
| 2,753,940 A | 7/1956 | Bonner |
| 3,055,682 A | 9/1962 | Bacher |
| 3,061,039 A | 10/1962 | Peters |
| 3,066,503 A | 12/1962 | Fleming |
| 3,302,069 A | 1/1967 | Webster |
| 3,334,495 A | 8/1967 | Jensen |
| 3,601,198 A | 8/1971 | Ahearn |
| 3,722,595 A | 3/1973 | Kiel |
| 3,764,233 A | 10/1973 | Strickland |
| 3,773,140 A | 11/1973 | Mahajan |
| 3,837,179 A | 9/1974 | Barth |
| 3,849,662 A * | 11/1974 | Blaskowski ............ F01K 23/02 290/2 |
| 3,881,551 A | 5/1975 | Terry |
| 3,978,877 A | 9/1976 | Cox |
| 4,037,431 A | 7/1977 | Sugimoto |
| 4,066,869 A | 1/1978 | Apaloo |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,421,975 A | 12/1983 | Stein |
| 4,432,064 A | 2/1984 | Barker |
| 4,442,665 A | 4/1984 | Fick et al. |
| 4,456,092 A | 6/1984 | Kubozuka |
| 4,506,982 A | 3/1985 | Smithers et al. |
| 4,512,387 A | 4/1985 | Rodriguez |
| 4,529,887 A | 7/1985 | Johnson |
| 4,538,916 A | 9/1985 | Zimmerman |
| 4,676,063 A | 6/1987 | Goebel et al. |
| 4,759,674 A | 7/1988 | Schroder |
| 4,793,386 A | 12/1988 | Sloan |
| 4,845,981 A | 7/1989 | Pearson |
| 4,877,956 A | 10/1989 | Priest |
| 4,922,463 A | 5/1990 | Del Zotto et al. |
| 5,004,400 A | 4/1991 | Handke |
| 5,006,044 A | 4/1991 | Walker, Sr. |
| 5,025,861 A | 6/1991 | Huber |
| 5,050,673 A | 9/1991 | Baldridge |
| 5,130,628 A | 7/1992 | Owen |
| 5,131,472 A | 7/1992 | Dees et al. |
| 5,134,328 A | 7/1992 | Johnatakis |
| 5,172,009 A | 12/1992 | Mohan |
| 5,189,388 A | 2/1993 | Mosley |
| 5,230,366 A | 7/1993 | Marandi |
| 5,334,898 A | 8/1994 | Skybyk |
| 5,366,324 A | 11/1994 | Arlt |
| 5,422,550 A | 6/1995 | McClanahan |
| 5,433,243 A | 7/1995 | Griswold |
| 5,517,593 A | 5/1996 | Nenniger |
| 5,517,822 A | 5/1996 | Haws et al. |
| 5,548,093 A | 8/1996 | Sato |
| 5,590,976 A | 1/1997 | Kilheffer et al. |
| 5,655,361 A | 8/1997 | Kishi |
| 5,712,802 A | 1/1998 | Kumar |
| 5,736,838 A | 4/1998 | Dove et al. |
| 5,755,096 A * | 5/1998 | Holleyman ............ B01D 45/14 55/407 |
| 5,790,972 A | 8/1998 | Kohlenberger |
| 5,865,247 A | 2/1999 | Paterson |
| 5,879,137 A | 3/1999 | Yie |
| 5,894,888 A | 4/1999 | Wiemers |
| 5,907,970 A | 6/1999 | Havlovick et al. |
| 6,007,227 A | 12/1999 | Carlson |
| 6,059,539 A | 5/2000 | Nyilas |
| 6,116,040 A | 9/2000 | Stark |
| 6,138,764 A | 10/2000 | Scarsdale et al. |
| 6,142,878 A | 11/2000 | Barin |
| 6,164,910 A | 12/2000 | Mayleben |
| 6,167,965 B1 | 1/2001 | Bearden |
| 6,202,702 B1 | 3/2001 | Ohira |
| 6,208,098 B1 | 3/2001 | Kume |
| 6,254,462 B1 | 7/2001 | Kelton |
| 6,271,637 B1 | 8/2001 | Kushion |
| 6,273,193 B1 | 8/2001 | Hermann |
| 6,315,523 B1 | 11/2001 | Mills |
| 6,321,860 B1 | 11/2001 | Reddoch |
| 6,477,852 B2 | 11/2002 | Dodo |
| 6,484,490 B1 | 11/2002 | Olsen |
| 6,491,098 B1 | 12/2002 | Dallas |
| 6,529,135 B1 | 3/2003 | Bowers et al. |
| 6,626,646 B2 | 9/2003 | Rajewski |
| 6,719,900 B2 | 4/2004 | Hawkins |
| 6,765,304 B2 | 7/2004 | Baten et al. |
| 6,776,227 B2 | 8/2004 | Beida |
| 6,786,051 B2 | 9/2004 | Kristich |
| 6,802,690 B2 | 10/2004 | Han |
| 6,808,303 B2 | 10/2004 | Fisher |
| 6,857,486 B2 | 2/2005 | Chitwood |
| 6,931,310 B2 | 8/2005 | Shimizu et al. |
| 6,936,947 B1 | 8/2005 | Leijon |
| 6,985,750 B1 | 1/2006 | Vicknair |
| 7,006,792 B2 | 2/2006 | Wilson |
| 7,011,152 B2 | 3/2006 | Soelvik |
| 7,082,993 B2 | 8/2006 | Ayoub |
| 7,104,233 B2 | 9/2006 | Ryczek et al. |
| 7,170,262 B2 | 1/2007 | Pettigrew |
| 7,173,399 B2 | 2/2007 | Sihler |
| 7,308,933 B1 | 12/2007 | Mayfield |
| 7,312,593 B1 | 12/2007 | Streicher et al. |
| 7,336,514 B2 | 2/2008 | Amarillas |
| 7,445,041 B2 | 11/2008 | O'Brien |
| 7,494,263 B2 | 2/2009 | Dykstra et al. |
| 7,500,642 B2 | 3/2009 | Cunningham |
| 7,525,264 B2 | 4/2009 | Dodge |
| 7,563,076 B2 | 7/2009 | Brunet |
| 7,581,379 B2 | 9/2009 | Yoshida |
| 7,660,648 B2 | 2/2010 | Dykstra |
| 7,675,189 B2 | 3/2010 | Grenier |
| 7,683,499 B2 | 3/2010 | Saucier |

(56) References Cited

U.S. PATENT DOCUMENTS

| | | |
|---|---|---|
| 7,717,193 B2 | 5/2010 | Egilsson et al. |
| 7,755,310 B2 | 7/2010 | West et al. |
| 7,807,048 B2 | 10/2010 | Collette |
| 7,835,140 B2 | 11/2010 | Mori |
| 7,845,413 B2 | 12/2010 | Shampine et al. |
| 7,901,314 B2 | 3/2011 | Salvaire |
| 7,926,562 B2 | 4/2011 | Poitzsch |
| 7,949,483 B2 | 5/2011 | Discenzo |
| 7,894,757 B2 | 7/2011 | Keast |
| 7,971,650 B2 | 7/2011 | Yuratich |
| 7,977,824 B2 | 7/2011 | Halen et al. |
| 8,037,936 B2 | 10/2011 | Neuroth |
| 8,054,084 B2 | 11/2011 | Schulz et al. |
| 8,069,710 B2 | 12/2011 | Dodd |
| 8,083,504 B2 | 12/2011 | Williams |
| 8,091,928 B2 | 1/2012 | Carrier |
| 8,096,354 B2 | 1/2012 | Poitzsch |
| 8,096,891 B2 | 1/2012 | Lochtefeld |
| 8,139,383 B2 | 3/2012 | Efraimsson |
| 8,146,665 B2 | 4/2012 | Neal |
| 8,154,419 B2 | 4/2012 | Daussin et al. |
| 8,174,853 B2 | 5/2012 | Kane |
| 8,232,892 B2 | 7/2012 | Overholt et al. |
| 8,261,528 B2 | 9/2012 | Chillar |
| 8,272,439 B2 | 9/2012 | Strickland |
| 8,310,272 B2 | 11/2012 | Quarto |
| 8,354,817 B2 | 1/2013 | Yeh et al. |
| 8,379,424 B2 | 2/2013 | Grbovic |
| 8,469,097 B2 | 6/2013 | Gray |
| 8,474,521 B2 | 7/2013 | Kajaria |
| 8,503,180 B2 | 8/2013 | Nojima |
| 8,506,267 B2 | 8/2013 | Gambier et al. |
| 8,534,235 B2 | 9/2013 | Chandler |
| 8,534,366 B2 | 9/2013 | Fielder |
| 8,573,303 B2 | 11/2013 | Kerfoot |
| 8,596,056 B2 | 12/2013 | Woodmansee |
| 8,616,005 B1 | 12/2013 | Cousino |
| 8,616,274 B2 | 12/2013 | Belcher et al. |
| 8,622,128 B2 | 1/2014 | Hegeman |
| 8,628,627 B2 | 1/2014 | Sales |
| 8,646,521 B2 | 2/2014 | Bowen |
| 8,692,408 B2 | 4/2014 | Zhang et al. |
| 8,727,068 B2 | 5/2014 | Bruin |
| 8,727,737 B2 | 5/2014 | Seitter |
| 8,727,783 B2 | 5/2014 | Chen |
| 8,760,657 B2 | 6/2014 | Pope |
| 8,763,387 B2 | 7/2014 | Schmidt |
| 8,774,972 B2 | 7/2014 | Rusnak |
| 8,789,601 B2 | 7/2014 | Broussard |
| 8,789,609 B2 | 7/2014 | Smith |
| 8,795,525 B2 | 8/2014 | McGinnis et al. |
| 8,800,652 B2 | 8/2014 | Bartko |
| 8,807,960 B2 | 8/2014 | Stephenson |
| 8,838,341 B2 | 9/2014 | Kumano |
| 8,851,860 B1 | 10/2014 | Mail |
| 8,857,506 B2 | 10/2014 | Stone, Jr. |
| 8,874,383 B2 | 10/2014 | Gambier |
| 8,899,940 B2 | 12/2014 | Laugemors |
| 8,905,056 B2 | 12/2014 | Kendrick |
| 8,905,138 B2 | 12/2014 | Lundstedt et al. |
| 8,997,904 B2 | 4/2015 | Cryer |
| 9,018,881 B2 | 4/2015 | Mao et al. |
| 9,051,822 B2 | 6/2015 | Ayan |
| 9,051,923 B2 | 6/2015 | Kuo |
| 9,061,223 B2 | 6/2015 | Winborn |
| 9,067,182 B2 | 6/2015 | Nichols |
| 9,080,412 B2 | 7/2015 | Wetzel |
| 9,103,193 B2 | 8/2015 | Coll |
| 9,119,326 B2 | 8/2015 | McDonnell |
| 9,121,257 B2 | 9/2015 | Coli |
| 9,140,110 B2 | 9/2015 | Coli et al. |
| 9,160,168 B2 | 10/2015 | Chapel |
| 9,175,554 B1 | 11/2015 | Watson |
| 9,206,684 B2 | 12/2015 | Parra |
| 9,260,253 B2 | 2/2016 | Naizer |
| 9,322,239 B2 | 4/2016 | Angeles Boza et al. |
| 9,324,049 B2 | 4/2016 | Thomeer |
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,482,086 B2 | 11/2016 | Richardson et al. |
| 9,499,335 B2 | 11/2016 | McIver |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra |
| 9,738,461 B2 | 8/2017 | DeGaray |
| 9,739,546 B2 | 8/2017 | Bertilsson et al. |
| 9,745,840 B2 | 8/2017 | Oehring et al. |
| 9,822,631 B2 | 11/2017 | Ravi |
| 9,840,897 B2 | 12/2017 | Larson |
| 9,840,901 B2 | 12/2017 | Oehring et al. |
| 9,841,026 B2 | 12/2017 | Stinessen |
| 9,863,228 B2 | 1/2018 | Shampine et al. |
| RE46,725 E | 2/2018 | Case |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,976,351 B2 | 5/2018 | Randall |
| 10,008,880 B2 | 6/2018 | Vicknair |
| 10,020,711 B2 * | 7/2018 | Oehring ............ E21B 43/26 |
| 10,167,863 B1 | 1/2019 | Cook |
| 10,184,465 B2 | 1/2019 | Enis et al. |
| 10,196,878 B2 | 2/2019 | Hunter |
| 10,227,854 B2 | 3/2019 | Glass |
| 10,232,332 B2 | 3/2019 | Oehring |
| 10,246,984 B2 | 4/2019 | Payne |
| 10,254,732 B2 | 4/2019 | Oehring |
| 10,260,327 B2 | 4/2019 | Kajaria |
| 10,280,724 B2 | 5/2019 | Hinderliter |
| 10,287,873 B2 | 5/2019 | Filas |
| 10,302,079 B2 | 5/2019 | Kendrick |
| 10,309,205 B2 | 6/2019 | Randall |
| 10,337,308 B2 | 7/2019 | Broussard |
| 10,371,012 B2 | 8/2019 | Davis |
| 10,378,326 B2 | 8/2019 | Morris |
| 10,393,108 B2 | 8/2019 | Chong |
| 10,407,990 B2 | 9/2019 | Oehring |
| 10,415,332 B2 | 9/2019 | Morris |
| 10,436,026 B2 | 10/2019 | Ounadjela |
| 10,443,660 B2 | 10/2019 | Harris |
| 10,627,003 B2 | 4/2020 | Dale et al. |
| 10,669,471 B2 | 6/2020 | Schmidt et al. |
| 10,669,804 B2 | 6/2020 | Kotrla |
| 10,695,950 B2 | 6/2020 | Igo et al. |
| 10,711,576 B2 | 7/2020 | Bishop |
| 2002/0169523 A1 | 11/2002 | Ross et al. |
| 2003/0056514 A1 | 3/2003 | Lohn |
| 2003/0079875 A1 | 5/2003 | Weng |
| 2003/0138327 A1 | 7/2003 | Jones et al. |
| 2004/0040746 A1 | 3/2004 | Niedermayr |
| 2004/0102109 A1 | 5/2004 | Crafty et al. |
| 2004/0167738 A1 | 8/2004 | Miller |
| 2005/0061548 A1 | 3/2005 | Hooper |
| 2005/0116541 A1 | 6/2005 | Seiver |
| 2005/0274508 A1 | 12/2005 | Folk |
| 2006/0052903 A1 | 3/2006 | Bassett |
| 2006/0065319 A1 | 3/2006 | Csitari |
| 2006/0260331 A1 | 11/2006 | Andreychuk |
| 2007/0125544 A1 | 6/2007 | Robinson |
| 2007/0131410 A1 | 6/2007 | Hill |
| 2007/0151731 A1 | 7/2007 | Butler |
| 2007/0187163 A1 | 8/2007 | Cone |
| 2007/0201305 A1 | 8/2007 | Heilman et al. |

(56) References Cited

U.S. PATENT DOCUMENTS

| | | |
|---|---|---|
| 2007/0204991 A1 | 9/2007 | Loree |
| 2007/0226089 A1 | 9/2007 | DeGaray et al. |
| 2007/0277982 A1 | 12/2007 | Shampine |
| 2007/0278140 A1 | 12/2007 | Mallet et al. |
| 2008/0017369 A1 | 1/2008 | Sarada |
| 2008/0041596 A1 | 2/2008 | Blount |
| 2008/0066911 A1 | 3/2008 | Luharuka |
| 2008/0095644 A1 | 4/2008 | Mantei et al. |
| 2008/0112802 A1 | 5/2008 | Orlando |
| 2008/0137266 A1 | 6/2008 | Jensen |
| 2008/0187444 A1 | 8/2008 | Molotkov |
| 2008/0208478 A1 | 8/2008 | Ella et al. |
| 2008/0217024 A1 | 9/2008 | Moore |
| 2008/0236818 A1 | 10/2008 | Dykstra |
| 2008/0264625 A1 | 10/2008 | Ochoa |
| 2008/0264640 A1 | 10/2008 | Eslinger |
| 2008/0264649 A1 | 10/2008 | Crawford |
| 2008/0303469 A1 | 12/2008 | Nojima |
| 2009/0045782 A1 | 2/2009 | Datta |
| 2009/0065299 A1 | 3/2009 | Vito |
| 2009/0078410 A1 | 3/2009 | Krenek et al. |
| 2009/0090504 A1 | 4/2009 | Weightman |
| 2009/0093317 A1 | 4/2009 | Kajiwara et al. |
| 2009/0095482 A1 | 4/2009 | Surjaatmadja |
| 2009/0101410 A1 | 4/2009 | Egilsson |
| 2009/0145611 A1 | 6/2009 | Pallini, Jr. |
| 2009/0153354 A1 | 6/2009 | Daussin et al. |
| 2009/0188181 A1 | 7/2009 | Forbis |
| 2009/0194273 A1 | 8/2009 | Surjaatmadja |
| 2009/0200035 A1 | 8/2009 | Bjerkreim et al. |
| 2009/0260826 A1 | 10/2009 | Sherwood |
| 2009/0308602 A1 | 12/2009 | Bruins et al. |
| 2010/0000508 A1 | 1/2010 | Chandler |
| 2010/0019574 A1 | 1/2010 | Baldassarre et al. |
| 2010/0038077 A1 | 2/2010 | Heilman |
| 2010/0038907 A1 | 2/2010 | Hunt |
| 2010/0045109 A1 | 2/2010 | Arnold |
| 2010/0051272 A1 | 3/2010 | Loree et al. |
| 2010/0101785 A1 | 4/2010 | Khvoshchev |
| 2010/0132949 A1 | 6/2010 | DeFosse et al. |
| 2010/0146981 A1 | 6/2010 | Motakef |
| 2010/0172202 A1 | 7/2010 | Borgstadt |
| 2010/0200224 A1 | 8/2010 | Nguete |
| 2010/0250139 A1 | 9/2010 | Hobbs et al. |
| 2010/0293973 A1 | 11/2010 | Erickson |
| 2010/0300683 A1 | 12/2010 | Looper |
| 2010/0303655 A1 | 12/2010 | Scekic |
| 2010/0310384 A1 | 12/2010 | Stephenson |
| 2010/0322802 A1 | 12/2010 | Kugelev |
| 2011/0005757 A1 | 1/2011 | Hebert |
| 2011/0017468 A1 | 1/2011 | Birch et al. |
| 2011/0052423 A1 | 3/2011 | Gambier |
| 2011/0061855 A1 | 3/2011 | Case et al. |
| 2011/0079302 A1 | 4/2011 | Hawes |
| 2011/0085924 A1 | 4/2011 | Shampine |
| 2011/0166046 A1 | 7/2011 | Weaver |
| 2011/0194256 A1 | 8/2011 | De Rijck |
| 2011/0247831 A1 | 10/2011 | Smith |
| 2011/0247878 A1 | 10/2011 | Rasheed |
| 2011/0272158 A1 | 11/2011 | Neal |
| 2012/0018016 A1 | 1/2012 | Gibson |
| 2012/0049625 A1 | 3/2012 | Hopwood |
| 2012/0067582 A1 | 3/2012 | Fincher |
| 2012/0085541 A1 | 4/2012 | Love et al. |
| 2012/0127635 A1 | 5/2012 | Grindeland |
| 2012/0152549 A1 | 6/2012 | Koroteev |
| 2012/0152716 A1 | 6/2012 | Kikukawa et al. |
| 2012/0205112 A1 | 8/2012 | Pettigrew |
| 2012/0205119 A1 | 8/2012 | Wentworth |
| 2012/0205301 A1 | 8/2012 | McGuire et al. |
| 2012/0205400 A1 | 8/2012 | DeGaray et al. |
| 2012/0222865 A1 | 9/2012 | Larson |
| 2012/0232728 A1 | 9/2012 | Karimi et al. |
| 2012/0247783 A1 | 10/2012 | Berner, Jr. |
| 2012/0255734 A1 | 10/2012 | Coli |
| 2013/0009469 A1 | 1/2013 | Gillett |
| 2013/0025706 A1 | 1/2013 | DeGaray et al. |
| 2013/0064528 A1 | 3/2013 | Bigex |
| 2013/0175038 A1 | 7/2013 | Conrad |
| 2013/0175039 A1 | 7/2013 | Guidry |
| 2013/0180722 A1 | 7/2013 | Caro |
| 2013/0189629 A1 | 7/2013 | Chandler |
| 2013/0199617 A1 | 8/2013 | DeGaray et al. |
| 2013/0233542 A1 | 9/2013 | Shampine |
| 2013/0242688 A1 | 9/2013 | Kageler |
| 2013/0255271 A1 | 10/2013 | Yu et al. |
| 2013/0278183 A1 | 10/2013 | Liang |
| 2013/0284278 A1 | 10/2013 | Winborn |
| 2013/0299167 A1 | 11/2013 | Fordyce |
| 2013/0306322 A1 | 11/2013 | Sanborn |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0041730 A1 | 2/2014 | Naizer |
| 2014/0054965 A1 | 2/2014 | Jain |
| 2014/0060658 A1 | 3/2014 | Hains |
| 2014/0095114 A1 | 4/2014 | Thomeer |
| 2014/0096974 A1 | 4/2014 | Coli |
| 2014/0124162 A1 | 5/2014 | Leavitt |
| 2014/0127036 A1 | 5/2014 | Buckley |
| 2014/0138079 A1 | 5/2014 | Broussard |
| 2014/0147310 A1 | 5/2014 | Hunt |
| 2014/0174717 A1 | 6/2014 | Broussard et al. |
| 2014/0205475 A1 | 7/2014 | Dale |
| 2014/0219824 A1 | 8/2014 | Burnette |
| 2014/0238683 A1 | 8/2014 | Korach |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0277772 A1 | 9/2014 | Lopez |
| 2014/0290768 A1 | 10/2014 | Randle |
| 2014/0332199 A1 | 11/2014 | Gilstad |
| 2014/0379300 A1 | 12/2014 | Devine et al. |
| 2015/0027712 A1 | 1/2015 | Vicknair |
| 2015/0053426 A1 | 2/2015 | Smith |
| 2015/0068724 A1 | 3/2015 | Coli et al. |
| 2015/0068754 A1 | 3/2015 | Coli et al. |
| 2015/0075778 A1 | 3/2015 | Walters |
| 2015/0078924 A1 | 3/2015 | Zhang |
| 2015/0083426 A1 | 3/2015 | Lesko |
| 2015/0097504 A1 | 4/2015 | Lamascus |
| 2015/0114652 A1 | 4/2015 | Lestz |
| 2015/0136043 A1 | 5/2015 | Shaaban |
| 2015/0144336 A1 | 5/2015 | Hardin et al. |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman |
| 2015/0211524 A1 | 7/2015 | Broussard |
| 2015/0217672 A1 | 8/2015 | Shampine |
| 2015/0225113 A1 | 8/2015 | Lungu |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras |
| 2015/0354322 A1 | 12/2015 | Vicknair |
| 2016/0032703 A1 | 2/2016 | Broussard et al. |
| 2016/0102537 A1 | 4/2016 | Lopez |
| 2016/0105022 A1 | 4/2016 | Oehring |
| 2016/0208592 A1 | 4/2016 | Oehring |
| 2016/0160889 A1 | 6/2016 | Hoffman et al. |
| 2016/0177675 A1* | 6/2016 | Morris ............ F01D 15/00 166/308.1 |
| 2016/0177678 A1 | 6/2016 | Morris |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang |
| 2016/0221220 A1 | 8/2016 | Paige |
| 2016/0230524 A1 | 8/2016 | Dumoit |
| 2016/0230525 A1 | 8/2016 | Lestz et al. |

(56) References Cited

U.S. PATENT DOCUMENTS

| | | |
|---|---|---|
| 2016/0258267 A1 | 9/2016 | Payne |
| 2016/0265457 A1 | 9/2016 | Stephenson |
| 2016/0273328 A1 | 9/2016 | Oehring |
| 2016/0273456 A1 | 9/2016 | Zhang et al. |
| 2016/0281484 A1 | 9/2016 | Lestz |
| 2016/0290114 A1 | 10/2016 | Oehring |
| 2016/0290563 A1 | 10/2016 | Diggins |
| 2016/0312108 A1 | 10/2016 | Lestz et al. |
| 2016/0319650 A1 | 11/2016 | Oehring |
| 2016/0326854 A1 | 11/2016 | Broussard |
| 2016/0326855 A1 | 11/2016 | Coli et al. |
| 2016/0341281 A1 | 11/2016 | Brunvold et al. |
| 2016/0348479 A1 | 12/2016 | Oehring |
| 2016/0349728 A1 | 12/2016 | Oehring |
| 2016/0369609 A1 | 12/2016 | Morris et al. |
| 2017/0016433 A1 | 1/2017 | Chong |
| 2017/0021318 A1 | 1/2017 | McIver et al. |
| 2017/0022788 A1 | 1/2017 | Oehring et al. |
| 2017/0022807 A1 | 1/2017 | Dursun |
| 2017/0028368 A1 | 2/2017 | Oehring et al. |
| 2017/0030177 A1 | 2/2017 | Oehring |
| 2017/0030178 A1 | 2/2017 | Oehring et al. |
| 2017/0036178 A1 | 2/2017 | Coli et al. |
| 2017/0036872 A1 | 2/2017 | Wallace |
| 2017/0037717 A1 | 2/2017 | Oehring |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0096885 A1 | 4/2017 | Oehring |
| 2017/0104389 A1 | 4/2017 | Morris et al. |
| 2017/0114625 A1 | 4/2017 | Norris |
| 2017/0130743 A1 | 5/2017 | Anderson |
| 2017/0138171 A1 | 5/2017 | Richards et al. |
| 2017/0146189 A1 | 5/2017 | Herman |
| 2017/0159570 A1 | 6/2017 | Bickert |
| 2017/0159654 A1 | 6/2017 | Kendrick |
| 2017/0175516 A1 | 6/2017 | Eslinger |
| 2017/0218727 A1 | 8/2017 | Oehring |
| 2017/0218843 A1 | 8/2017 | Oehring et al. |
| 2017/0222409 A1 | 8/2017 | Oehring et al. |
| 2017/0226838 A1 | 8/2017 | Ciezobka |
| 2017/0226842 A1 | 8/2017 | Omont et al. |
| 2017/0234250 A1 | 8/2017 | Janik |
| 2017/0241221 A1 | 8/2017 | Seshadri |
| 2017/0259227 A1 | 9/2017 | Morris et al. |
| 2017/0292513 A1 | 10/2017 | Haddad |
| 2017/0313499 A1 | 11/2017 | Hughes et al. |
| 2017/0314380 A1 | 11/2017 | Oehring |
| 2017/0314979 A1 | 11/2017 | Ye et al. |
| 2017/0328179 A1 | 11/2017 | Dykstra |
| 2017/0369258 A1 | 12/2017 | DeGaray |
| 2018/0028992 A1 | 2/2018 | Stegemoeller |
| 2018/0038216 A1 | 2/2018 | Zhang |
| 2018/0045331 A1 | 2/2018 | Lopez |
| 2018/0216455 A1 | 8/2018 | Andreychuk |
| 2018/0238147 A1 | 8/2018 | Shahri |
| 2018/0245428 A1 | 8/2018 | Richards |
| 2018/0258746 A1 | 9/2018 | Broussard |
| 2018/0266412 A1 | 9/2018 | Stokkevag |
| 2018/0291713 A1 | 10/2018 | Jeanson |
| 2018/0320483 A1 | 11/2018 | Zhang |
| 2018/0343125 A1 | 11/2018 | Clish |
| 2018/0363437 A1 | 12/2018 | Coli |
| 2019/0003329 A1 | 1/2019 | Morris |
| 2019/0010793 A1 | 1/2019 | Hinderliter |
| 2019/0055827 A1 | 2/2019 | Coli |
| 2019/0063309 A1 | 2/2019 | Davis |
| 2019/0100989 A1 | 4/2019 | Stewart |
| 2019/0112910 A1 | 4/2019 | Oehring |
| 2019/0119096 A1 | 4/2019 | Haile |
| 2019/0120024 A1 | 4/2019 | Oehring |
| 2019/0128080 A1 | 5/2019 | Ross |
| 2019/0162061 A1 | 5/2019 | Stephenson |
| 2019/0169971 A1 | 6/2019 | Oehring |
| 2019/0178057 A1 | 6/2019 | Hunter |
| 2019/0178235 A1 | 6/2019 | Coskrey |
| 2019/0203567 A1 | 7/2019 | Ross |
| 2019/0203572 A1 | 7/2019 | Morris |
| 2019/0211661 A1 | 7/2019 | Reckels |
| 2019/0226317 A1 | 7/2019 | Payne |
| 2019/0245348 A1 | 8/2019 | Hinderliter |
| 2019/0292866 A1 | 9/2019 | Ross |
| 2019/0292891 A1 | 9/2019 | Kajaria |
| 2019/0316447 A1 | 10/2019 | Oehring |
| 2020/0047141 A1 | 2/2020 | Oehring et al. |
| 2020/0088152 A1 | 3/2020 | Allion et al. |
| 2020/0194976 A1 | 6/2020 | Benussi |
| 2020/0232454 A1 | 7/2020 | Chretien |

FOREIGN PATENT DOCUMENTS

| | | |
|---|---|---|
| CA | 2158637 | 9/1994 |
| CA | 2406801 | 11/2001 |
| CA | 2653069 | 12/2007 |
| CA | 2707269 | 12/2010 |
| CA | 2482943 | 5/2011 |
| CA | 3050131 | 11/2011 |
| CA | 2773843 | 10/2012 |
| CA | 2845347 | 10/2012 |
| CA | 2955706 | 10/2012 |
| CA | 2966672 | 10/2012 |
| CA | 3000322 | 4/2013 |
| CA | 2787814 | 2/2014 |
| CA | 2833711 | 5/2014 |
| CA | 2978706 | 9/2016 |
| CA | 2944980 | 2/2017 |
| CA | 3006422 | 6/2017 |
| CA | 3018485 | 8/2017 |
| CA | 2964593 | 10/2017 |
| CA | 2849825 | 7/2018 |
| CA | 3067854 A1 | 1/2019 |
| CA | 2919649 | 2/2019 |
| CA | 2919666 | 7/2019 |
| CA | 2797081 | 9/2019 |
| CA | 2945579 | 10/2019 |
| CN | 101639059 | 2/2010 |
| CN | 201687513 | 12/2010 |
| CN | 101977016 | 2/2011 |
| CN | 201730812 | 2/2011 |
| CN | 201819992 | 5/2011 |
| CN | 201925157 | 8/2011 |
| CN | 202023547 | 11/2011 |
| CN | 202157824 | 3/2012 |
| CN | 102602322 | 7/2012 |
| CN | 202406331 | 8/2012 |
| CN | 202463670 | 10/2012 |
| CN | 202500735 | 10/2012 |
| CN | 202545207 | 11/2012 |
| CN | 103095209 | 5/2013 |
| CN | 102758604 | 12/2014 |
| CN | 205986303 U | 2/2017 |
| CN | 108049999 A | 5/2018 |
| EP | 3453827 | 3/2019 |
| EP | 3456915 | 3/2019 |
| JP | 2004264589 | 9/2004 |
| JP | 3626363 | 3/2005 |
| JP | 2008263774 | 10/2008 |
| JP | 2012-117371 | 6/2012 |
| KR | 20100028462 | 3/2010 |
| RU | 48205 | 9/2005 |
| RU | 98493 | 10/2010 |
| RU | 2421605 | 6/2011 |
| WO | 93/20328 | 10/1993 |
| WO | 98/53182 | 11/1998 |
| WO | 2008/136883 | 11/2008 |
| WO | 2009/023042 | 2/2009 |
| WO | 2011/127305 | 10/2011 |
| WO | 2012/122636 | 9/2012 |
| WO | 2012/137068 | 10/2012 |
| WO | 2016/144939 | 9/2016 |
| WO | 2016/160458 | 10/2016 |

(56) References Cited

FOREIGN PATENT DOCUMENTS

OTHER PUBLICATIONS

Office Action dated Apr. 10, 2018 in related U.S. Appl. No. 15/294,349.
Office Action dated Apr. 2, 2018 in related U.S. Appl. No. 15/183,387.
Office Action dated May 29, 2018 in related U.S. Appl. No. 15/235,716.
Canadian Office Action dated Apr. 18, 2018 in related Canadian Patent Application No. 2,928,711.
UK Power Networks—Transformers to Supply Heat to Tate Modern—from Press Releases May 16, 2013.
Non-Final Office Action issued in corresponding U.S. Appl. No. 15/293,681 dated Feb. 16, 2017.
Non-Final Office Action issued in corresponding U.S. Appl. No. 15/294,349 dated Mar. 14, 2017.
Final Office Action issued in corresponding U.S. Appl. No. 15/145,491 dated Jan. 20, 2017.
Non-Final Office Action issued in corresponding U.S. Appl. No. 15/145,443 dated Feb. 7, 2017.
Notice of Allowance issued in corresponding U.S. Appl. No. 15/217,040 dated Mar. 28, 2017.
Notice of Allowance issued in corresponding U.S. Appl. No. 14/622,532 dated Mar. 27, 2017.
Non-Final Office Action issued in corresponding U.S. Appl. No. 15/291,842 dated Jan. 6, 2017.
Final Office Action issued in corresponding U.S. Appl. No. 14/622,532 dated Dec. 7, 2016.
Non-Final Office Action issued in corresponding U.S. Appl. No. 14/622,532 dated May 17, 2016.
Final Office Action issued in corresponding U.S. Appl. No. 14/622,532 dated Dec. 21, 2015.
Non-Final Office Action issued in corresponding U.S. Appl. No. 14/622,532 dated Aug. 5, 2015.
Non-Final Office Action issued in corresponding U.S. Appl. No. 15/145,491 dated Sep. 12, 2016.
Non-Final Office Action issued in corresponding U.S. Appl. No. 15/217,040 dated Nov. 29, 2016.
Non-Final Office Action issued in corresponding U.S. Appl. No. 15/235,788 dated Dec. 14, 2016.
Non-Final Office Action issued in corresponding U.S. Appl. No. 15/145,491 dated May 15, 2017.
Non-Final Office Action dated Feb. 12, 2019 in related U.S. Appl. No. 16/170,695.
International Search Report and Written Opinion dated Feb. 15, 2019 in related PCT Application No. PCT/US18/63977.
Non-Final Office Action dated Feb. 25, 2019 in related U.S. Appl. No. 16/210,749.
International Search Report and Written Opinion dated Mar. 5, 2019 in related PCT Application No. PCT/US18/63970.
Non-Final Office Action dated Mar. 6, 2019 in related U.S. Appl. No. 15/183,387.
Office Action dated Mar. 1, 2019 in related Canadian Patent Application No. 2,943,275.
Office Action dated Jan. 30, 2019 in related Canadian Patent Application No. 2,936,997.
Office Action dated Dec. 12, 2018 in related U.S. Appl. No. 16/160,708.
International Search Report and Written Opinion dated Jan. 2, 2019 in related PCT Patent Application No. PCT/US18/54542.
International Search Report and Written Opinion dated Jan. 2, 2019 in related PCT Patent Application No. PCT/US18/54548.
International Search Report and Written Opinion dated Dec. 31, 2018 in related PCT Patent Application No. PCT/US18/55913.
International Search Report and Written Opinion dated Jan. 4, 2019 in related PCT Patent Application No. PCT/US18/57539.
Canadian Office Action dated Jun. 22, 2018 in related Canadian Patent Application No. 2,886,697.
Office Action dated Jul. 25, 2018 in related U.S. Appl. No. 15/644,487.
Non-Final Office Action dated Oct. 4, 2018 in related U.S. Appl. No. 15/217,081.
International Search Report and Written Opinion dated Sep. 19, 2018 in related PCT Patent Application No. PCT/US2018/040683.
Canadian Office Action dated Sep. 28, 2018 in related Canadian Patent Application No. 2,945,281.
International Search Report and Written Opinion dated Apr. 10, 2019 in corresponding PCT Application No. PCT/US2019/016635.
Notice of Allowance dated Apr. 23, 2019 in corresponding U.S. Appl. No. 15/635,028.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
Non-Final Office Action issued in corresponding U.S. Appl. No. 15/486,970 dated Jun. 22, 2017.
Non-Final Office Action issued in corresponding U.S. Appl. No. 15/487,656 dated Jun. 23, 2017.
Non-Final Office Action issued in corresponding U.S. Appl. No. 15/487,694 dated Jun. 26, 2017.
Final Office Action issued in corresponding U.S. Appl. No. 15/294,349 dated Jul. 6, 2017.
Non-Final Office Action issued in corresponding U.S. Appl. No. 14/884,363 dated Sep. 5, 2017.
Final Office Action issued in corresponding U.S. Appl. No. 15/145,491 dated Sep. 6, 2017.
Non-Final Office Action issued in corresponding U.S. Appl. No. 14/881,535 dated Oct. 6, 2017.
Non-Final Office Action issued in corresponding U.S. Appl. No. 15/145,414 dated Nov. 29, 2017.
Non-Final Office Action issued in corresponding U.S. Appl. No. 15/644,487 dated Nov. 13, 2017.
International Search Report and Written Opinion dated Jan. 2, 2020 in related PCT Application No. PCT/US19/55325.
Notice of Allowance dated Jan. 9, 2020 in related U.S. Appl. No. 16/570,331.
Non-Final Office Action dated Dec. 23, 2019 in related U.S. Appl. No. 16/597,008.
Non-Final Office Action dated Jan. 10, 2020 in related U.S. Appl. No. 16/597,014.
Non-Final Office Action dated Dec. 6, 2019 in related U.S. Appl. No. 16/564,186.
International Search Report and Written Opinion dated Nov. 26, 2019 in related PCT Application No. PCT/US19/51018.
International Search Report and Written Opinion dated Feb. 11, 2020 in related PCT Application No. PCT/US2019/055323.
International Search Report and Written Opinion dated Jul. 9, 2019 in corresponding PCT Application No. PCT/US2019/027584.
Office Action dated Jun. 11, 2019 in corresponding U.S. Appl. No. 16/210,749.
Office Action dated May 10, 2019 in corresponding U.S. Appl. No. 16/268,030.
Canadian Office Action dated May 30, 2019 in corresponding CA Application No. 2,833,711.
Canadian Office Action dated Jun. 20, 2019 in corresponding CA Application No. 2,964,597.
Office Action dated Jun. 7, 2019 in corresponding U.S. Appl. No. 16/268,030.
International Search Report and Written Opinion dated Sep. 11, 2019 in related PCT Application No. PCT/US2019/037493.
Office Action dated Aug. 19, 2019 in related U.S. Appl. No. 15/356,436.
Office Action dated Oct. 2, 2019 in related U.S. Appl. No. 16/152,732.
Office Action dated Sep. 11, 2019 in related U.S. Appl. No. 16/268,030.
Office Action dated Oct. 11, 2019 in related U.S. Appl. No. 16/385,070.
Canadian Office Action dated Oct. 1, 2019 in related Canadian Patent Application No. 2,936,997.

(56) References Cited

OTHER PUBLICATIONS

Office Action dated Sep. 20, 2019 in related U.S. Appl. No. 16/443,273.
Final Office Action dated Mar. 31, 2020 corresponding to U.S. Appl. No. 15/356,436.
Non-Final Office Action dated Mar. 3, 2020 corresponding to U.S. Appl. No. 16/ 152,695.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
International Search Report and Written Opinion issued in PCT/US2020/023809 dated Jun. 2, 2020.
Karin, "Duel Fuel Diesel Engines," (2015), Taylor & Francis, pp. 62-63, Retrieved from https://app.knovel.com/hotlink/toc/id:kpDFDE0001/dual-fuel-diesel-engines/duel-fuel-diesel-engines (Year 2015).
Goodwin, "High-voltage auxilliary switchgear for power stations," Power Engineering Journal, 1989, 10 pg. (Year 1989).
Office Action dated Jul. 23, 2020 in related U.S. Appl. No. 16/597,014.
International Search Report and Written Opinion dated Jun. 23, 2020 in corresponding PCT Application No. PCT/US20/23912.
International Search Report and Written Opinion dated Jul. 22, 2020 in corresponding PCT Application No. PCT/US20/00017.
Office Action dated Aug. 4, 2020 in related U.S. Appl. No. 16/385,070.
Office Action dated Jun. 29, 2020 in related U.S. Appl. No. 16/404,283.
Office Action dated Jun. 29, 2020 in related U.S. Appl. No. 16/728,359.
Office Action dated Jun. 22, 2020 in related U.S. Appl. No. 16/377,861.
Canadian Office Action dated Aug. 18, 2020 in related CA Patent Application No. 2,933,444.
Canadian Office Action dated Aug. 17, 2020 in related CA Patent Application No. 2,944,968.
Borets, "Berets Oil Equipment," accessed Sep. 4, 2020, 158 pages.
Andrew Howard Nunn, "The feasibility of natural gas as a fuel source for modern land-based drilling," Dec. 2011, 94 pages.
R. Saidur, "Applications of variable speed drive (VSD) in electrical motors energy savings," 2012, vol. 16, pp. 543-550.
Discenzo, "Next Generation Pump Systems Enable New Opportunities for Asset Management and Economic Optimization," accessed Sep. 4, 2020, 8 pages.
Nikolich, "Compressors, pumps, refrigeration equipment: improvement and specialization of piston pumps for oil and gas well-drilling and production operations," 1996, Chemical and Petroleum Engineering, vol. 32, pp. 157-162.
Finger, "Sandia National Handbook Laboratories Report: Slimhole handbook: procedures and recommendations for slimhole drilling and testing in geothermal exploration," Oct. 1999, 164 pages.
Steve Besore, MTU Detroit Diesel Inc., "How to select generator sets for today's oil and gas drill rigs: careful comparison and selection can improve performance and reduce costs," May 5, 2010, 4 pages, https://www.mtu-online.com/fileadmin/fm-dam/mtu-usa/mtuinnorthamerica/white-papers/WhitePaper_EDP.pdf.
Pemberton, "Strategies for Optimizing pump efficiency and LCC performance: process pumps are the largest consumers of energy in a typical pulp and paper mill—boosting their efficiency is a new avenue to reduced plant operating costs," Jun. 2003, Paper Age, pp. 28-32.
Robert B. Thompson, "Optimizing the production system using real-time measurements: a piece of the digital oilfield puzzle," Nov. 11-14, 2007, SPE Annual Technical Conference and Exhibition, Anaheim, CA, pp. 1-10.
Guffey, "Field testing of variable-speed beam-pump computer control," May 1991, SPE Production Engineering, pp. 155-160.
Irvine, "The use of variable frequency drives as a final control in the petroleum industry," 2000, IEEE, pp. 2749-2758.
R. Ikeda et al., "Hydraulic fracturing technique: pore pressure effect and stress heterogeneity," 1989, Int. J. Rock Mech. Min. Sci. & Geomech., vol. 26, No. 6, pp. 471-475.
Coli Patent Application, "Mobile, modular, electrically powered system for use in fracturing underground formations," filed Apr. 7, 2011, 28 pages.
Gardner Denver—Well Servicing Pump Model GD-2500Q, GD-25000-HD, Quintuplex Pumps, GWS Fluid End Parts List, Jul. 2011, 39 pages.
Gardner Denver GD-2500Q Well Service Pump, 2 pages.
Gardner Denver C-2500 Quintuplex Well Service Pump, 2013, 2 pages.
Toshiba 2011 Industrial Catalog, Drives, PAC, PLCs, 2011, 272 pages.
Gardner Denver GD-2500 Quintuplex Well Service Pump, 2003, 2 pages.
Gardner Denver GD-2500Q Quintuplex Well Service Pump Operating and Service Manual, Aug. 2005, 46 pages.
Gardner Denver GD-2500Q Quintuplex Well Service Pump Power End Parts List, Apr. 2007, 15 pages.
Toshiba H9 ASD Installation and Operation Manual, Mar. 2011, 287 pages.
Offshore Technology Conference, Houston, TX, Apr. 30-May 3, 2012, Honghua Group Brochure and Pictures, 6 pages.
Honghua Group Customer Spreadsheet, 2 pages.
Charlotte Owen, "Chinese company launches new tracking rigs," May 2, 2012, Oil & Gas Technology Magazine, 2 pages.
Honghua Group Limited, Complete Equipment and System Integrating by Using of Gas Power-gen and Power Grid and VFD System, 30 pages.
Honghua Group Limited, Is gas and electricity driven equipment the future trend for develop lithologic reservoirs, 2 pages.
ABB Group, MV Drive benefits for shale gas applications, Powerpoint, Apr. 2012, 16 pages.
U.S. Well Services, Game-changing hydraulic fracturing technology, reduces emissions by 99%: U.S. Well Services's patented clean fleet technology proven to cut emission, save fuel and allow for quieter operations on site, Oct. 1, 2014, 3 pages.
ASME, Hydraulic Fracturing's Greener Tint, Jan. 11, 2018, 2 pages.
Fluid Power, Clean Fleet Reduces Emissions by 99% at Hydraulic Fracturing Sites, Jan. 11, 2005, 3 pages.
Louisiana State University, Petroleum alumnus and team develop mobile fracturing unit that alleviates environmental Impact, LSU School of EE & CS, Nov. 2012, 2 pages.
Linda Kane, Energy pipeline: US Well Services brings clean fleet to Weld County, Nov. 4, 2015, Greeley Tribute, 7 pages.
Business Wire, Hunghua Group showcases shale gas, offshore and land drilling solutions at the 2013 Offshore Technology Conference, May 6, 2013, 2 pages.
Joanne Liou, Hunghua Group introduces 6,000-hp integrated shale gas system, Drilling Matters, May 21, 2012, 2 pages.
Tess Record—Trademark for Clean Fleet registered Sep. 5, 2013, accessed Jan. 14, 2020, 2 pages.
U.S. Well Services, About U.S. Well Services, accessed Jan. 14, 2020, 14 pages.
Unknown, "Improving the Drilling Cycle," Oilfield Technology, Dec. 2009, vol. 2, Issue 9, 5 pages.
Unknown, "Andon (manufacturing)," last edited Sep. 8, 2019, https://en.wikipedia.org/w/index.php?title=Andon_(manufacturing)&oldid=914575778, 2 pages.
S.K. Subramaniam, "Production monitoring system for monitoring the industrial shop floor performance," 2009, International Journal of Systems Applications, Engineering & Development, vol. 3, Issue 1, pp. 28-35.
Unknown, Evolution Well Services advances fracturing operations with an electrically powered system,Calgary PR Newswire, Jun. 4, 2012, 2 pages.
Honghua Group, Honghua America, LLC, HHF—1600 Mud Pump, 2 pages.
Honghua Group, Honghua Shale Gas Solutions Power Point Slides, Feb. 2012, 41 pages.

(56) References Cited

OTHER PUBLICATIONS

Mactel, Frac Test with VFDs Final Report Hydraulic Fracturing Pilot Test Results and Preliminary Full Scale Design United Nuclear Church Rock Facility, Dec. 23, 2003, 73 pages.
Jon Gates, ASME Hydraulic Fracturing Conference, Mar. 24, 2015, http://www.otrglobal.com/newsroom/cnotes/128720, 6 pages.
Gardner Denver Well Servicing Pump Model C2500Q Quintuplex Operating and Service Manual, Apr. 2011, 46 pages.
Coli, Mobile, modular, electrically powered system for use in fracturing underground formations using liquid petroleum gas, Oct. 5, 2012, U.S. Appl. No. 61/710,393, 59 pages.
Toshiba, G9 Brochure—G9 Series Adjustable Speed Drives, Jun. 2007, 6 pages.
Luis Gamboa, "Variable Frequency Drives in Oil and Gas Pumping Systems," Pumps & Systems, Dec. 17, 2011, https://www.pumpsandsystems.com/variable-frequency-drives-oil-and-gas-pumping-systems, 5 pages.
Unknown, "U.S. Well Services for Antero Fracking," Oct. 3, 2014, HHP Insight, http://hhpinsight.com/epoperations/2014/10/u-s-well-services-for-antero-fracking/, 3 pages.
Stuart H. Loewenthal, Design of Power-Transmitting Shafts, Nasa Reference Publication 1123, Jul. 1984, 30 pages.
Response to Non-Final Office Action dated Aug. 3, 2015 in related U.S. Appl. No. 13/679,689, 62 pages.
George E. King, "Hydraulic Fracturing 101: What Every Representative, Environmentalist, Regulator, Reporter, Investor, University Researcher, Neighbor and Engineer Should Know About Estimating Frac Risk and Improving Frac Performance in Unconventional Gas and Oil Wells," Feb. 6-8, 2012, Society of Petroleum Engineers, 80 pages.
Gardner Denver Pumps, GD2500Q Quintuplex Pump, Oct. 14, 2019, http://www.gardnerdenver.com/en-us/pumps/quintuplex-pump-gd-2500q#menu, 7 pages.
TMEIC, TMEIC Industrial Motors Manual, 2012, 12 pages.
Toshiba, Toshiba Q9 ASD Installation and Operation Manual, Apr. 2010, 233 pages.
ABB, ABB drives in power generation: medium voltage drives for more efficient and reliable plant operation, 2006, 12 pages.
ABB, Industry Brochure—ABB drives in chemical, oil and gas medium voltage drives for greater profitability and performance, 2009, 16 pages.
ABB, ABB drives in chemical, oil and gas Medium voltage drives for greater profitability and performance, 2011, 16 pages.
ABB, Drive PC Tools: Startup and maintenance, DriveWindow Light, 2014, 2 pages.
ABB, Global Center of Excellence DC Drives: DriveWindow light upgrade for DC drives Used for DWL 2.95 and DC DriveAP, Dec. 4, 2018, 1 page.
ABB, ABB Drive Ware User's Manual, DriveWindow 2, Dec. 31, 2012, 604 pages.
ABB, ABB Drive Ware Users Guide, DriveWindow Light 2, Oct. 15, 2013, 45 pages.
Warren Electric Corp., Hydraulic heaters maintain fluid quality and consistency, Hydraulics & Pneumatics, Dec. 30, 2010, 12 pages.
Onyx Industries Inc., Stack Light Engineering Reference Guide, Sep. 23, 2012, 4 pages.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power for Land, Sea and Air, vol. 79887, pp. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-burner) 06 Sep. 6, 2018 (Sep. 6, 2018), entire document, especially para (Burners for refinery Heaters].
Water and Glycol Heating Systems• (https://www.heat-inc.com/wg-series-water-glycol-systems/) Jun. 18, 2018 (Jun. 18, 2018), entire document, especially WG Series Water Glycol Systems.
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
International Search Report and Written Opinion dated Aug. 28, 2020 in PCT/US20/23821.

\* cited by examiner

SYSTEM FOR FUELING ELECTRIC POWERED HYDRAULIC FRACTURING EQUIPMENT WITH MULTIPLE FUEL SOURCES

CROSS REFERENCE TO RELATED APPLICATIONS

This application is a continuation of U.S. patent application Ser. No. 15/487,656, filed Apr. 14, 2017, and claims priority to and the benefit of U.S. Provisional Patent Application No. 62/323,303, filed Apr. 15, 2016, and is a continuation-in-part of, and claims priority to and the benefit of, co-pending U.S. patent application Ser. No. 15/235,788, filed Aug. 12, 2016, which is in turn a continuation-in-part of, and claims priority to and the benefit of, co-pending U.S. patent application Ser. No. 15/202,085, filed Jul. 5, 2016, which is a continuation of, and claims priority to and the benefit of, U.S. patent application Ser. No. 13/679,689, filed Nov. 16, 2012, now U.S. Pat. No. 9,410,410, issued Aug. 9, 2016, the full disclosures of which are hereby incorporated by reference herein for all purposes.

BACKGROUND

1. Technical Field

This disclosure relates generally to hydraulic fracturing and more particularly to systems and methods for fueling electric powered hydraulic fracturing equipment using turbine generators fueled by multiple fuel sources.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems, the fracturing equipment is powered by large diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. Most turbines are configured only to be fueled by natural gas, and the associated gas compression systems are typically only capable of handling natural gas to feed the turbines.

Thus, it may be desirable to modify turbine operation in order to expand operability of the turbines.

SUMMARY

The present disclosure is directed to a system and method for fueling one or more turbines using a variety of fuel sources besides natural gas, including liquid fuels and gasified solid fuels. The fueled turbines are then used to power electric hydraulic fracturing equipment.

In accordance with an aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one generator electrically coupled to the plurality of electric pumps so as to generate electricity for use by the plurality of electric pumps; a gas compression system fluidly coupled to the at least one generator so as to provide fuel for use by the at least one generator; and a combustible fuel vaporization system gaseously coupled to the gas compression system so as to provide at least one of vaporized fuel or gasified fuel, or a combination thereof, to the gas compression system.

In an embodiment, the system can further include at least one of a liquid fuel source or a solid fuel source. In an embodiment, each of the liquid fuel source and the solid fuel source can be configured to supply fuel to the combustible fuel vaporization system.

In an embodiment, each of the liquid fuel source and the solid fuel source can include at least one of a hydrogen-based, hydrocarbon-based, or alcohol-based fuel source, or any combination thereof.

In an embodiment, the liquid fuel source can include any of a kerosene, methanol, No. 2 fuel oil, hydrogen, liquefied natural gas (LNG), substitute natural gas (SNG), liquid hydrocarbon, or ammonia fuel source, or any combination thereof.

In an embodiment, the solid fuel source can include any of a wood gas or coal gas fuel source, or a combination thereof.

In an embodiment, the system can further include an inert gas source, wherein an inert gas is provided to regulate the liquid fuel source or the solid fuel source prior to providing fuel for use by the at least one generator.

In an embodiment, the inert gas source can include at least one of an oxygen-lean or a nitrogen-rich inert gas source, or a combination thereof.

In an embodiment, the system can further include at least one filter configured to filter at least one of particulates, water, or condensate, or a combination thereof, from at least one of the liquid fuel source and the solid fuel source.

In an embodiment, the system can further include a vaporized gas heating system in gaseous communication with the combustible fuel vaporization system so as to prevent the vaporized gas from cooling to below a condensation point associated with the vaporized gas.

In an embodiment, the vaporized gas heating system can be powered by the at least one generator.

In an embodiment, the system can further include a variable frequency drive connected to the at least one electric motor to control the speed of the at least one electric motor, wherein the variable frequency drive can frequently perform electric motor diagnostics to prevent damage to the at least one electric motor.

In an embodiment, the at least one generator can include one of a turbine generator or a reciprocating engine generator, or a combination thereof.

In accordance with another aspect of the disclosed subject matter, the method and system of the present disclosure provide a hydraulic fracturing system for fracturing a subterranean formation. In an embodiment, the system can include a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation; at least one turbine generator electrically coupled to the plurality of electric pumps so as to generate electricity for use by the plurality of electric pumps; a gas compression system fluidly coupled to the at least one turbine generator so as to provide fuel for use by the at least one turbine generator; a combustible fuel vaporization system gaseously coupled to the gas compression system so as to provide at least one of vaporized fuel or gasified fuel, or a combination thereof, to the gas compression system; and a variable frequency drive connected to the at least one electric motor to control the speed of the at least one electric motor, wherein the variable frequency drive frequently performs electric motor diagnostics to prevent damage to the at least one electric motor.

Other aspects and features of the present disclosure will become apparent to those of ordinary skill in the art after reading the detailed description herein and the accompanying figures.

BRIEF DESCRIPTION OF DRAWINGS

Some of the features and benefits of the present disclosure having been stated, others will become apparent as the description proceeds when taken in conjunction with the accompanying drawings, in which.

Figure 1:
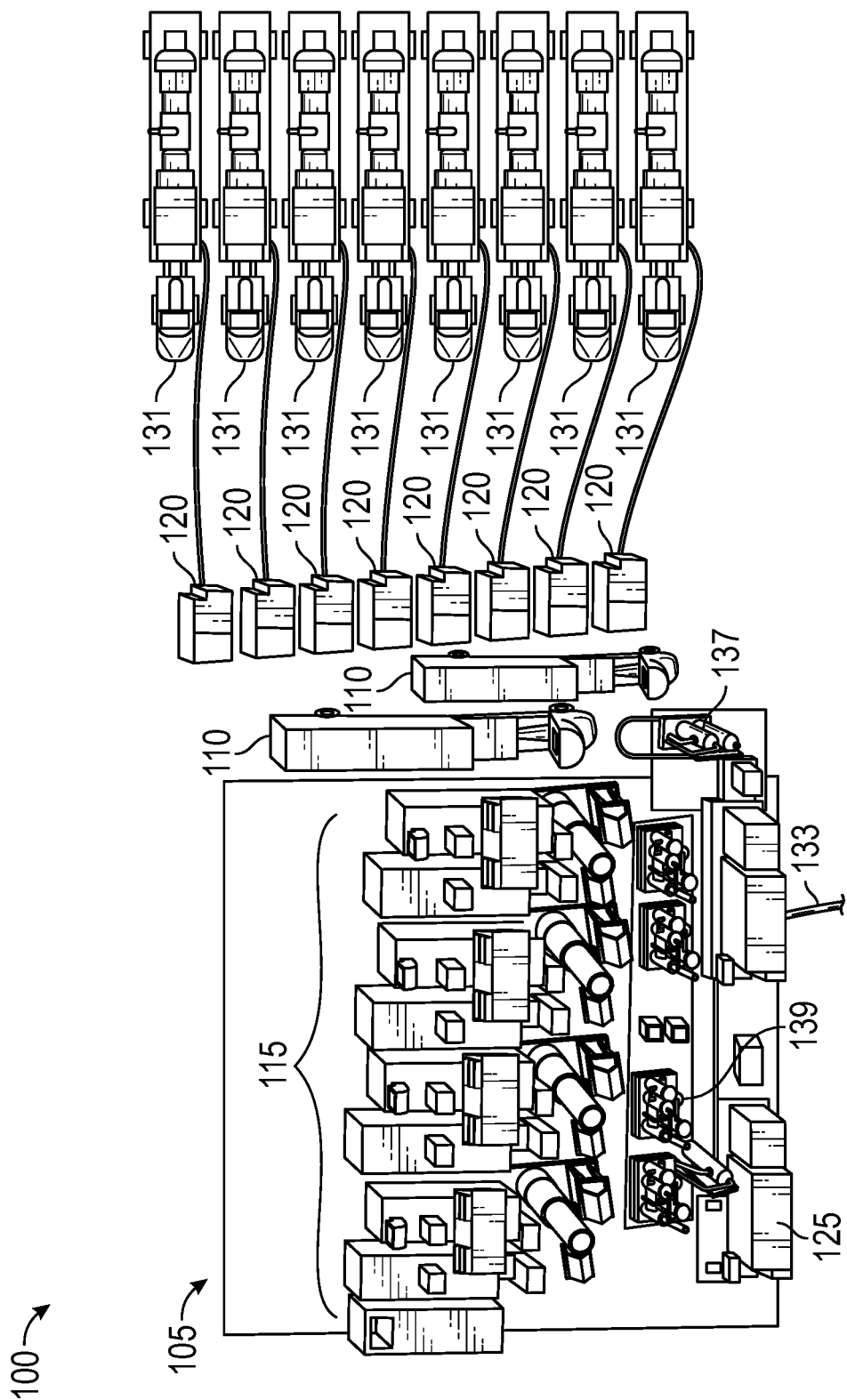
FIG. 1 is an overhead perspective view of an example of a power generation system for a hydraulic fracturing system having power generating turbines and gas compression according to an embodiment of the disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Described herein are example methods and systems for fueling electricity generating turbines with multiple fuel sources, where the turbines provide power to electric hydraulic fracturing equipment.

FIG. 1 shows in an overhead perspective view of an example 100 of a power generation system 105 for hydraulic fracturing having power generating turbines and gas compression functionality. In the illustrated embodiment, gas can enter through main gas line 133, and enter one or more compressors 125. In some examples, compressed gas can flow through one or more sand trap and separator 137, and through one or more filter 139, before being provided to power the one or more turbines 115. Switch gear units 110 can be disposed in elongated trailers located adjacent to the turbines 115, and 13.8 kV to 600 V transformers 120 are shown arranged on a side of the switch gear units 110 opposite the turbines 115. Fracturing pump units 131 can be positioned adjacent to, and electrically coupled with, the transformers 120. Additional components (not shown) of a hydraulic fracturing system can include flowback tanks, pressure relief tanks, well heads, control units, sand silos, a data van, and mixing equipment such as blenders and a hydration unit.

In a method or system according to an embodiment of the present disclosure, vaporized liquid fuels and/or gasified solid fuels that are hydrogen-, hydrocarbon-, or alcohol-based can be utilized to fuel one or more electricity generating turbines for a hydraulic fracturing system. A combustible liquid fuel vaporization system can be used along with an existing gas compression system to allow the turbines to utilize multiple types of combustible liquids. The ability to power the turbines with various different combustible liquids will provide the option to use the cheapest available fuels based on market price, or to use renewable biofuels to achieve a "greener" image for hydraulic fracturing. The capability to vaporize liquid fuels also allows for fuel storage on well sites in the liquid form as a reserve to use as needed. This will save money and help prevent downtime during operations.

In a non-limiting example of operation, gas can be fed into the inlets of the compressors at approximately 90 psi. However, if required, the system can work on a suction pressure range of 35 psi to 180 psi. Gas can be supplied to the system from a sales line, gas wellhead, storage tank, or mobile transport(s), or alternatively from a customer compressor station at approximately 100 psi to 200 psi. The system can also optionally include two or more three-phase separators and one or more sand traps to filter out large particulates and the majority of the water and condensate that is carried in pre-refined natural gas before delivering the fuel to the turbines.

Example pressures for fuel exiting the compressors can range from about 150 psi to 380 psi, and can have a normal case discharge pressure of about 300 psi. Downstream of the compressors, the high pressure gas can be routed through a final filtration process to be conditioned for the turbines. Several manifolds can be in place on both the high pressure and low pressure sides of the system, in order to correctly route the fuel. This configuration has the advantage of keeping all of the turbines on a single fuel rail, such that if a single compressor fails, the other compressor(s) can still supply gas to all of the turbines.

Examples of voltages of electricity generated by properly fueled turbines include 13.8 kV, 480 V, 600 V, and 4,160 V, which can be three-phase electricity with a +/−10% voltage adjustment range. Optionally, multiple 5.7 MW turbines are used to supply enough electrical power to the fracturing system. Other mobile turbine generator configurations are possible as well, including turbines that are rated to output power in a range of 1 MW per turbine to 50 MW per turbine. Another possible configuration includes a single 25 MW turbine to provide power, with a smaller secondary turbine rated for 5.7 MW for auxiliary power or starting power. In an embodiment, a variable frequency drive (VFD) can be utilized to control the speed of an electric motor associated with a pump powered by the turbine(s).

Example fuels include liquid fuels such as kerosene, methanol, No. 2 fuel oil, hydrogen, liquefied natural gas (LNG), ammonia, and the like, and combinations thereof; and gasified solid fuels such as wood gas or coal gas.

Optionally included with the fuel supply system is a liquid vaporization skid, which in one example can accommodate liquid hydrocarbon fuel such as (but not limited to) kerosene, diesel, biodiesel, gasoline, low viscosity fuel oils, and liquid petroleum (LP) gas. Alcohol fuels (chemically or biologically produced) such as methanol, ethanol, butanol, and propanol (among others); or mixtures such as E5, E10 (gasohol), E15, E85, hE15 (uses hydrous ethanol with excess water), ED95 (has a lowered ignition point designed to be used with diesel motors), any other common or uncommon ratio of ethanol and gasoline, Ecalene (an alcohol fuel mixture composed of ethanol, methanol, propanol, butanol, and hexanol), and any other alcohol and/or hydrocarbon mixtures, can also be used. Embodiments exist where the fuel system uses liquid hydrogen as an alternative fuel. In an embodiment, synthetic natural gas or substitute natural gas ("SNG") can be formed by vaporizing the hydrocarbon fuels. Further optionally, the SNG can be compressed to a designated pressure range for use by the turbines, and can be burned as a fuel source to power the generator for the production of electricity.

An inert gas can be used to regulate the new SNG fuel before it reaches the turbines to avoid the need to modify the turbines with new hardware (such as fuel injectors) and software to control a more or less combustible fuel source. Most vaporized fuels will contain more or less energy than natural gas. Hydrocarbons with more carbon in the molecule have a higher heating value, and propane ($C_3H_8$) has nearly three times the energy density of methane ($CH_4$). This large difference in energy can be regulated without modifying the turbines by using air that has some oxygen content removed and has a larger percentage of nitrogen. For example, ambient air includes, by volume, approximately 78% nitrogen ($N_2$), 21% oxygen ($O_2$) and 1% argon (Ar), with other trace gases. An example of a low oxygen, high nitrogen content includes air having about 13% by volume of oxygen and about 86% by volume of nitrogen.

An air separator can be used to reduce the oxygen volumetric percentage and elevate the nitrogen volumetric percentage in an inert gas. Depending on the energy content of the vaporized fuel, either gas could be used to regulate the fuel for combustion in the turbine. The oxygen rich gas can even be used to reduce emissions after the fuel is burned in the turbine's combustion chamber.

Liquefied natural gas ("LNG") can be vaporized into natural gas to be used as well, which may advantageously provide the ability to transport and store natural gas on well sites lacking a natural gas line to supply fuel. To prevent vaporized gas from cooling to below its condensation point and liquefying upstream of the turbines, oxygen-lean gas can be heated before the premixing process in the vaporizer unit to help carry the fuel to its destination. Heaters on the pipes can also be utilized to keep the gas route warm enough so the vapor does not condense. In an embodiment, electric heaters can be powered by the turbines when the turbines are running, and by a standby generator (black start generator) if the turbines have not yet been started.

In an embodiment, LNG can be used as a fuel for the turbines if a supply of natural gas is inadequate or unavailable at a well site by utilizing a refillable LNG skid with a built-in vaporizer. In this example, the vaporizer can convert the liquid LNG to vapor, which can then be supplied to the gas compression system to feed the turbines. With this option, one or more LNG vaporization skids can be used instead of the natural gas supply pipeline, resulting in nominal fuel gas conditioning and premixing. Moreover, gas energy content can be minimally regulated as a large oxygen separator may not be used to enrich or downgrade the fuel gas mixture.

Another embodiment allows for the use of any liquid fuel instead of LNG alone, and may not require use of the LNG vaporizer. In examples where a liquid fuel vaporization system is already in use for other non-hydraulic fracturing applications, the liquid fuel vaporization system can be integrated into the gas compression system. This configuration can allow the turbines powering the electric hydraulic fracturing equipment to be fueled by any of the sources discussed herein. In this example, the fuel gas can be regulated with lean premixing to produce a synthetic natural gas having an energy content similar to that of methane-based natural gas.

Figure 2:
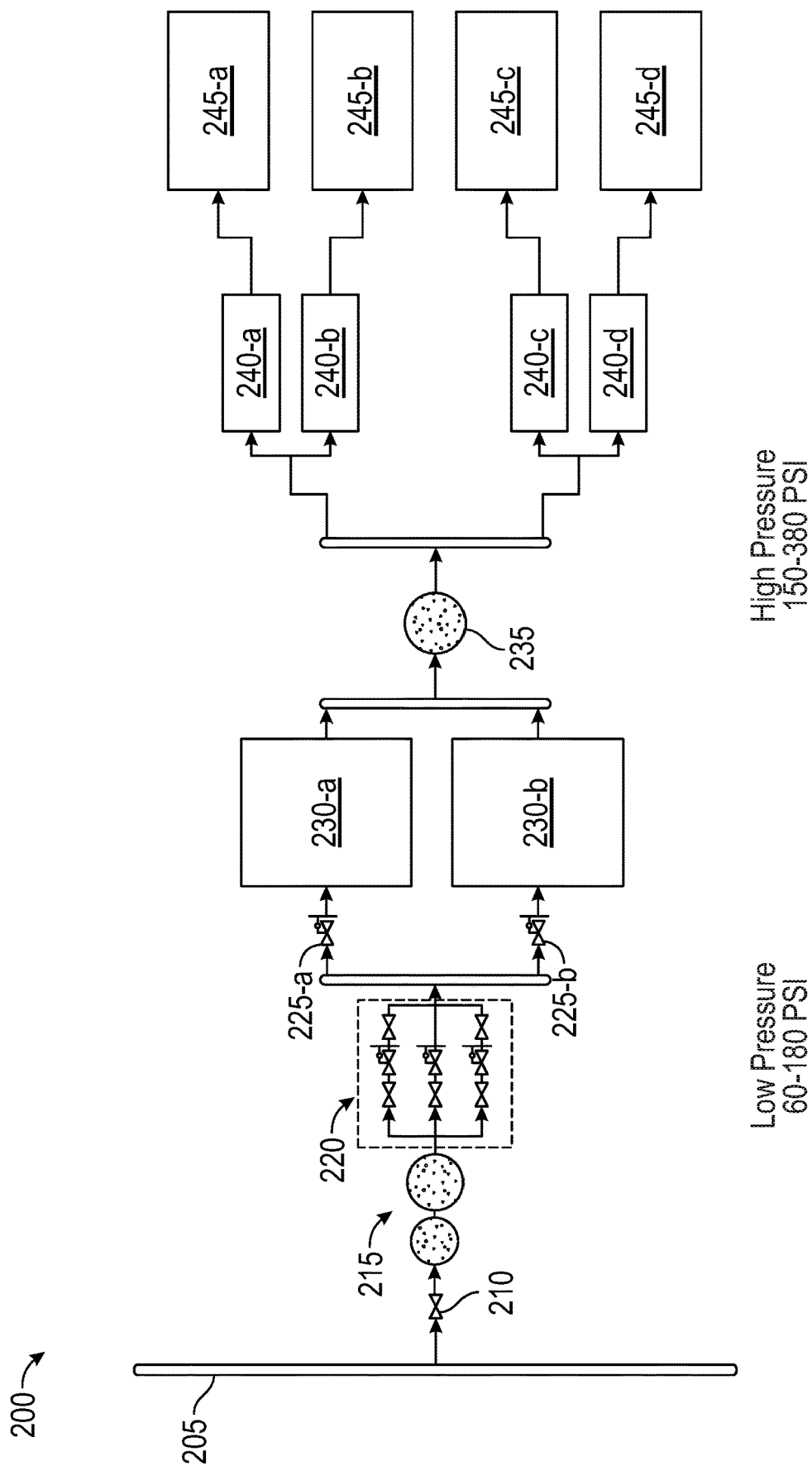
FIG. 2 is a schematic example of a gas compression system according to an embodiment of the disclosure.

FIG. 2 shows a block diagram of a schematic example of a gas compression system 200 according to an embodiment.

A main gas supply line 205, as illustrated in an embodiment shown in FIG. 2, extends along a lateral side of the system, allowing gas from the main gas supply line 205 to flow through shutoff valve 210, and through filtration vessels including a three-phase separator and sand trap 215, in order to filter at least one of particulate, water, or condensate from the gas. From there, the filtered gas can flow into a pressure regulation skid 220, where the gas can be prepared for the gas compression units 230-a, 230-b.

One example of a gas compression system 200 can rely on one or more fuel gas compression units 230-a, 230-b capable of supplying up to 5,000 MCF of fuel gas per day to a plurality of natural gas-fueled electric turbines 245-a, 245-b, 245-c, 245-d. In an embodiment, the system 200 can include multiple gas pressure regulators, including an entire skid dedicated to pressure regulation 220. In an embodiment, the pressure regulation skid 220 can regulate the pressure of incoming fuel at a low pressure in the range of 60-180 pounds per square inch (PSI). In an embodiment, the pressure regulation skid 220 can contain three regulator conduits, with the center regulator conduit being closed and held in reserve in the event of failure of a primary regulator, valve, fitting, or pipe. The system can be capable of being supplied from a single regulator if necessary. Several more individual valves and regulators 210, 225-a, 225-b can be placed upstream and downstream of the regulation skid 220, one on each inlet to the compressors 230-a, 230-b or in any other combination, to further reduce the suction gas pressure, if required.

Gas at a regulated pressure can exit pressure regulator skid 220 and enter a manifold for the compressor inlet before entering gas compression units 230-a, 230-b. After being boosted from the gas compression units 230-a, 230-b, the gas can flow through a manifold for the compressor outlet and through another three-phase separator 235, through a manifold for the filtration inlet into the final gas filtration skids 240-a, 240-b, 240-c, 240-d to filter any remaining impurities from the gas and to heat the gas to 50 degrees Fahrenheit above the condensation point for that gas, then into the turbines 245-a, 245-b, 245-c, 245-d at a high pressure in the range of 150-380 PSI, and at approximately 300 PSI in the illustrated embodiment, to power the turbines 245-a, 245-b, 245-c, 245-d. In some embodiments two or more gas filtration skids 240-a, 240-b, 240-c, 240-d may be grouped on one or more trailers at the well site.

Figure 3:
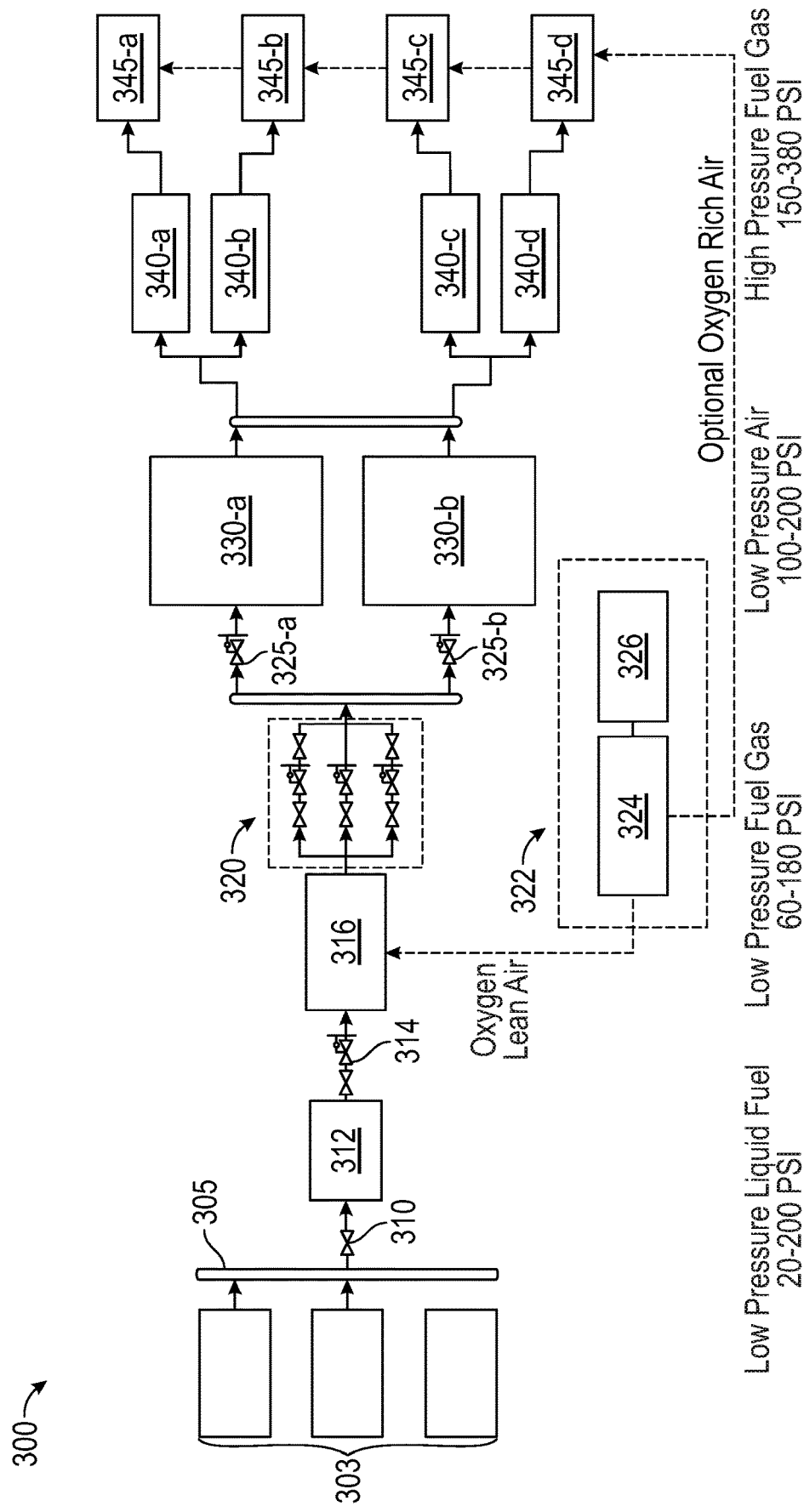
FIG. 3 is a schematic block diagram of an example of a gas compression system having a liquid fuel vaporization system according to an embodiment of the disclosure.

Shown in schematic block diagram form in FIG. 3 is an example of a gas compression system 300 having a liquid fuel vaporization system 316. In the illustrated example, instead of a main gas supply (as is shown in FIG. 2), gas compression system 300 can include a manifold 305 for connecting and unloading liquid fuel delivery tankers 303. In fluid communication with the manifold 305 is an optional fuel storage vessel 312, which can receive fluid from the liquid fuel delivery tankers 303 via shutoff valve 310. The storage vessel 312 can prevent downtime if there is an interruption in fuel deliveries. Fuel can be received at and stored in the storage vessel 312 in a low pressure liquid form in the range of 20-200 PSI in some embodiments.

In some embodiments, liquid fuel can be purified prior to delivery, such that use of filtration vessels, such as a three-phase separator and sand trap 215 as illustrated in FIG. 2, is not necessary. In other embodiments, filtration vessels may be added to the gas compression system 300.

Downstream from the fuel storage vessel 312, as part of the fuel vaporizing and premixing system, can be a fuel vaporization skid 316, which can receive liquid fuel and vaporize the liquid fuel into a gaseous state. In the gaseous state, the fuel can remain at a low pressure, in the range of 60-180 PSI, according to an embodiment. Oxygen-lean air can be injected into the vaporization skid 316 from a line shown connecting to an oxygen separation skid 322. An air compressor 324 can be included with the oxygen separation skid 322 for urging the air into the vaporization skid 316, and an air separator 326 can be provided for separating the oxygen from the air. Adding oxygen-lean air to regulate the energy of the new SNG or other fuel forms a gas similar to methane-based natural gas. Optionally, the separated oxygen can be sent to the turbines 345-a, 345-b, 345-c, 345-d in the form of oxygen-rich air to help aid in combustion or to reduce the emissions of exhaust gases produced during operation of the turbines 345-a, 345-b, 345-c, 345-d.

If required, extra pressure regulation or fuel filtering can be applied to any embodiment. Fuel filtering can include three-phase separators and sand traps for liquid or gaseous fuels, as illustrated in the embodiment shown in FIG. 2.

Regulators can be in the form of a specialized unit containing multiple regulators and bypass or isolation valves, such as pressure regulator skid 320, or can be individual regulators 314, 325-a, 325-b spread throughout the compression system. Each piece of equipment can contain dedicated internal pressure regulators.

Valves 310 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Like the system 200 of FIG. 2, the gas compression system 300 of FIG. 3 includes gas compression units 330-a, 330-b, turbines 345-a, 345-b, 345-c, 345-d downstream of the gas compression units 330-a, 330-b, and filtration units 340-a, 340-b, 340-c, 340-d between the gas compression units 330-a, 330-b and turbines 345-a, 345-b, 345-c, 345-d. Unlike the system of FIG. 2, a three-phase separator is not provided downstream of the compressors in an embodiment illustrated in FIG. 3. However, the three-phase separators and sand trap(s) can be included in the embodiment illustrated in FIG. 3 if the fuel has a high amount of undesirable water or particulate matter.

A possible problem could arise if the vaporized fuel source has a higher energy content than natural gas. To overcome this, the vaporized fuel can be mixed with reduced-oxygen gas to lower the energy of the newly vaporized fuel to a level equivalent to that of natural gas. The reduced oxygen gas can be derived from an oxygen separation skid 322, from exhaust gases produced by the turbines 345-a, 345-b, 345-c, 345-d, or from any other exhaust gas-producing equipment. Another option lies with the turbines 345-a, 345-b, 345-c, 345-d themselves, in that the fuel distribution system and premixing within the turbines can be modified to operate with the higher or lower energy content of the vaporized gas. This configuration may require a hardware and software change, however, which is not desirable and can be expensive, time consuming, and limiting.

The fuel can spontaneously ignite before reaching the combustion chamber of the turbines 345-a, 345-b, 345-c, 345-*d* in an event typically referred to as auto-ignition. This premature detonation can be damaging to the turbine and can increase emissions. By mixing the fuel with an inert gas or lower oxygen gas, auto-ignition can be delayed or prevented. While ambient air has approximately 21% oxygen content, reducing the oxygen level to below 13% can greatly reduce the chances of auto ignition.

Figure 4:
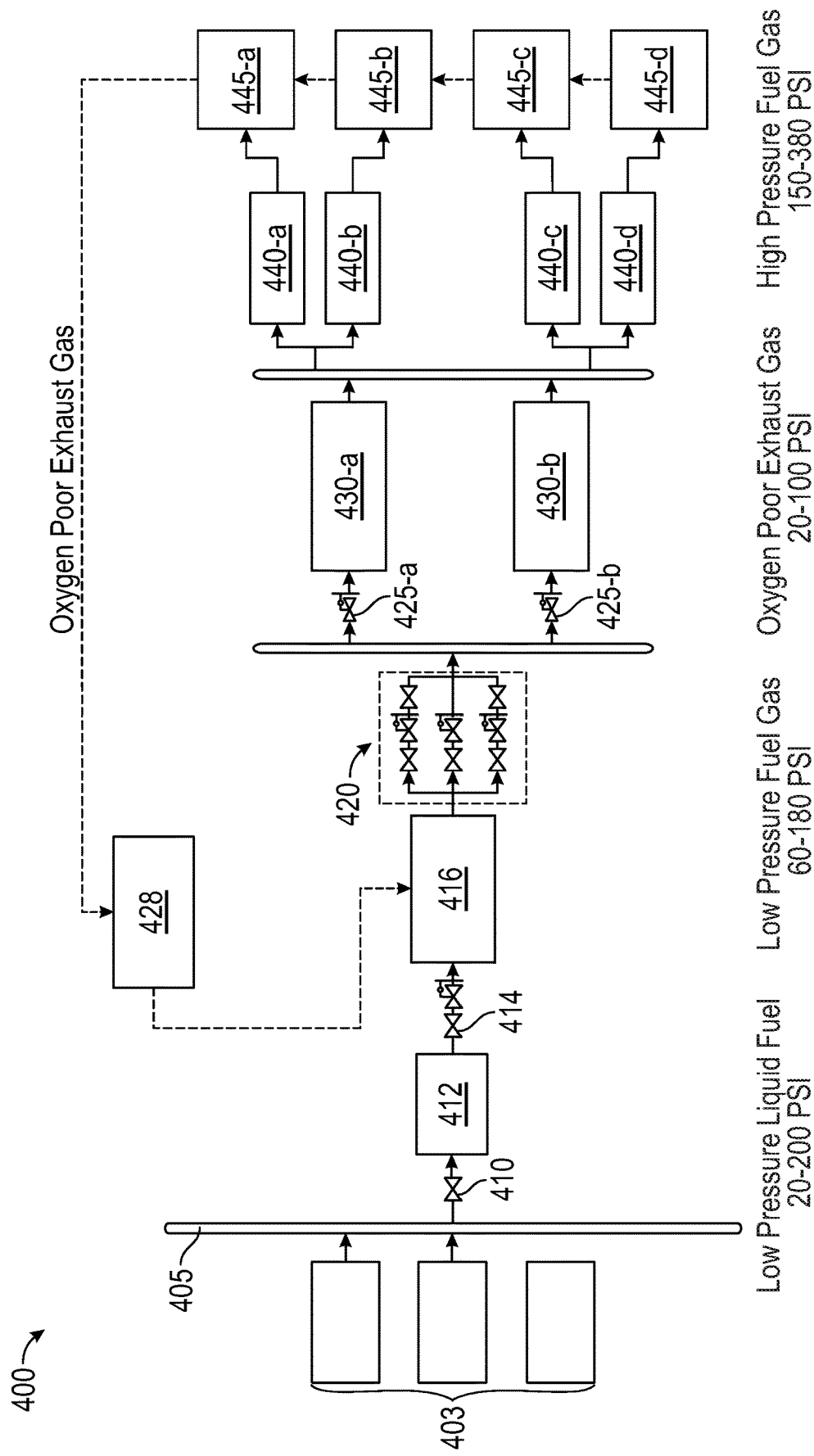
FIG. 4 is a schematic block diagram of an alternate example of a gas compression system having a liquid fuel vaporization system according to an embodiment of the disclosure.

Referring now to FIG. 4, shown in schematic block diagram form is another embodiment of a gas compression system 400 which provides oxygen-lean air to the fuel vaporization process. As illustrated in the embodiment shown in FIG. 4, gas compression system 400 can include a manifold 405 for connecting and unloading liquid fuel delivery tankers 403. In an alternate embodiment, a main gas supply line, for example as illustrated in an embodiment shown in FIG. 2, can extend along a lateral side of the system, allowing gas from the main gas supply line to flow through filtration vessels into the vaporization skid. In fluid communication with the manifold 405 is an optional fuel storage vessel 412, which can receive fluid from the liquid fuel delivery tankers 403 via shutoff valve 410. The storage vessel 412 can prevent downtime if there is an interruption in fuel deliveries. Fuel can be received at and stored in the storage vessel 412 in a low pressure liquid form in the range of 20-200 PSI in some embodiments.

Downstream from the fuel storage vessel 412, as part of the fuel vaporizing and premixing system, can be a fuel vaporization skid 416, which can receive liquid fuel and vaporize the liquid fuel into a gaseous state. In the gaseous state, the fuel can remain at a low pressure, in the range of 60-180 PSI, according to an embodiment.

Regulators can be in the form of a specialized unit containing multiple regulators and bypass or isolation valves, such as pressure regulator skid 420, or can be individual regulators 414, 425-*a*, 425-*b* spread throughout the compression system. Each piece of equipment can contain dedicated internal pressure regulators.

Valves 410 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Like the system 200 of FIG. 2, the gas compression system 400 of FIG. 4 can include gas compression units 430-*a*, 430-*b*, turbines 445-*a*, 445-*b*, 445-*c*, 445-*d* downstream of the gas compression units 430-*a*, 430-*b*, and filtration units 440-*a*, 440-*b*, 440-*c*, 440-*d* between the gas compression units 430-*a*, 430-*b* and turbines 445-*a*, 445-*b*, 445-*c*, 445-*d*. Unlike the system of FIG. 2, a three-phase separator is not provided downstream of the compressors in an embodiment illustrated in FIG. 4. However, the three-phase separators and sand trap(s) can be included in the embodiment illustrated in FIG. 4 if the fuel has a high amount of undesirable water or particulate matter.

In the embodiment illustrated in FIG. 4, oxygen-poor exhaust gas from the turbines 445-*a*, 445-*b*, 445-*c*, 445-*d* can be routed to the vaporization skid 416, where the exhaust gas can be mixed with the fuel. The exhaust gas regulates the energy content of the vaporized fuel by diluting the oxygen content of the air. In some embodiments, the oxygen poor exhaust gas can travel from the turbines 445-*a*, 445-*b*, 445-*c*, 445-*d* through an optional air compressor unit 428 before being mixed with the fuel at vaporization skid 416.

Figure 5:
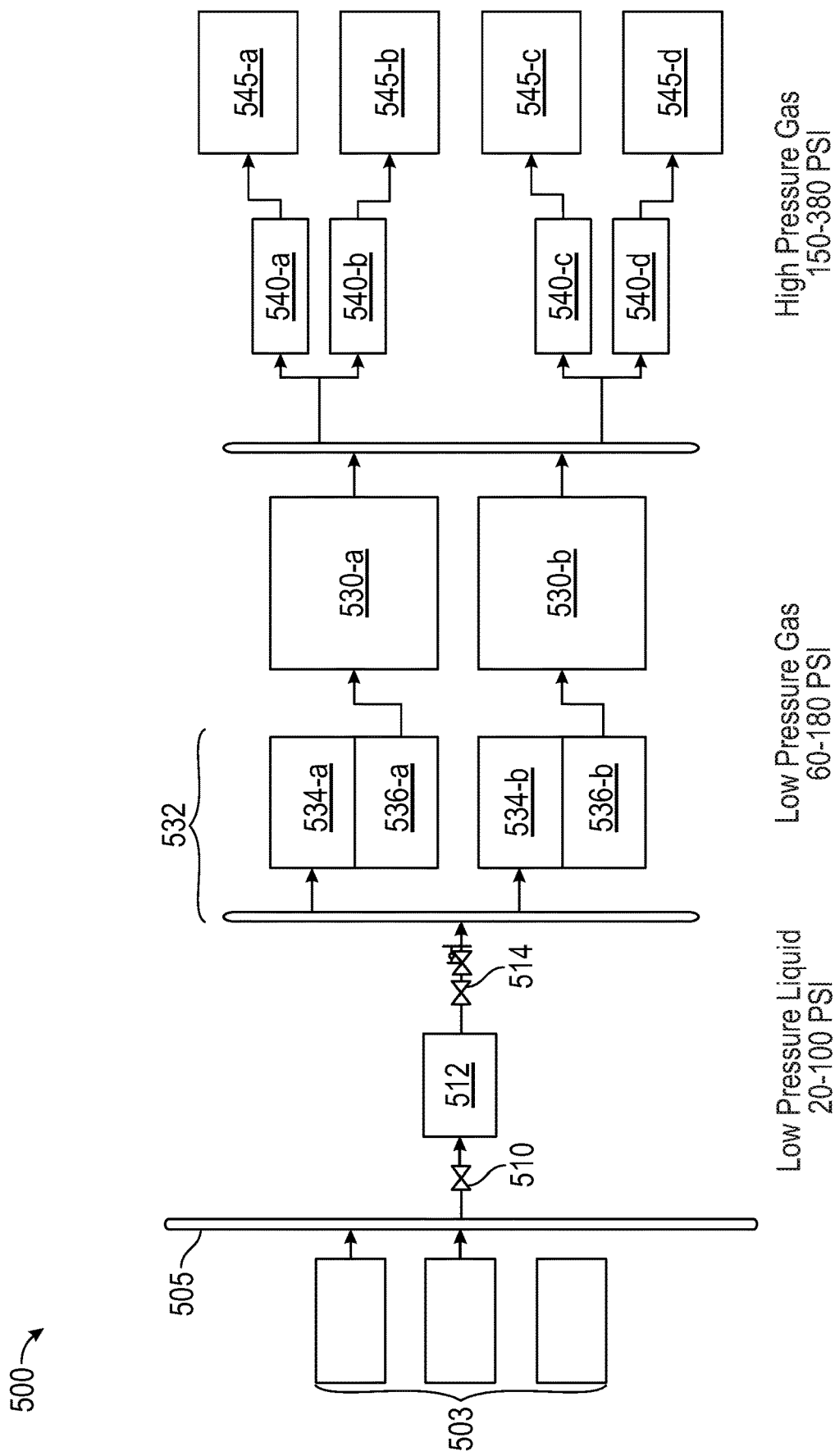
FIG. 5 is a schematic block diagram of another alternate example of a gas compression system with a liquid fuel vaporization system and that includes an oxygen separator according to an embodiment of the disclosure.

Another example of a gas compression system according to an embodiment is shown in block diagram schematic form in FIG. 5. In this example the gas compression system 500 includes a fuel vaporization system 532 with a dedicated liquid vaporization 534-*a*, 534-*b* and oxygen separation unit 536-*a*, 536-*b* for each compressor 530-*a*, 530-*b*. Further, in this embodiment, pressure regulation can be performed on vaporization trailers within the fuel vaporization system 532, such that external regulators can be optional. A high pressure gas manifold between the compressors 530-*a*, 530-*b* and the filtration units 540-*a*, 540-*b*, 540-*c*, 540-*d* is also optional, and can be present only if load sharing of the compressors 530-*a*, 530-*b* is desired.

As illustrated in the embodiment shown in FIG. 5, gas compression system 500 can include a manifold 505 for connecting and unloading liquid fuel delivery tankers 503. In an alternate embodiment, a main gas supply line, for example as illustrated in an embodiment shown in FIG. 2, can extend along a lateral side of the system, allowing gas from the main gas supply line to flow through filtration vessels. In fluid communication with the manifold 505 is an optional fuel storage vessel 512, which can receive fluid from the liquid fuel delivery tankers 503 via shutoff valve 510. The storage vessel 512 can prevent downtime if there is an interruption in fuel deliveries. Fuel can be received at and stored in the storage vessel 512 in a low pressure liquid form in the range of 20-200 PSI in some embodiments.

Regulators can be in the form of a specialized unit containing multiple regulators and bypass or isolation valves, such as the pressure regulator skid 320, 420 as illustrated in the embodiments shown in FIGS. 3 and 4, or can be individual regulators 514 spread throughout the compression system. Each piece of equipment can contain dedicated internal pressure regulators.

Valves 510 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

Figure 6:
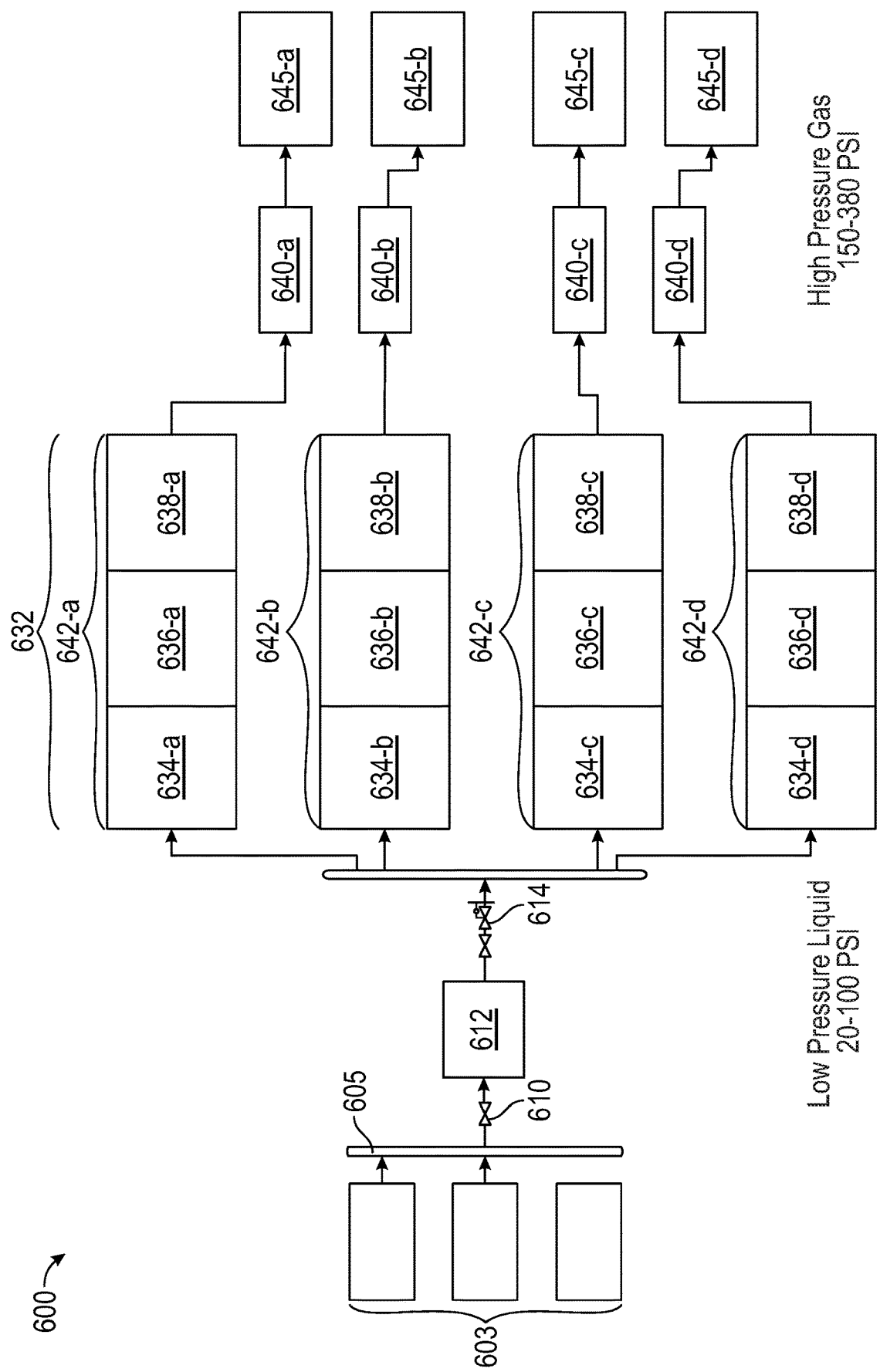
FIG. 6 is a schematic of an example of a gas compression system according to an embodiment of the disclosure.

FIG. 6 is another example of a gas compression system 600 according to an embodiment, shown in block diagram schematic form. Here, a gas vaporization and compression system 632 may include dedicated gas vaporization and compression units 642-*a*, 642-*b*, 642-*c*, 642-*d* provided for each turbine 645-*a*, 645-*b*, 645-*c*, 645-*d*. The dedicated gas vaporization and compression units 642-*a*, 642-*b*, 642-*c*, 642-*d* can each include an oxygen separator 634-*a*, 634-*b*, 634-*c*, 634-*d*, a vaporizer 636-*a*, 636-*b*, 636-*c*, 636-*d*, and a compressor 638-*a*, 638-*b*, 638-*c*, 638-*d*, respectively.

The modular approach depicted in FIG. 6 can have the flexibility of operating a different number of turbines, depending on a particular application. For example, the system can easily be modified to generate 5 MW (for a single turbine) or less power for a drilling rig, as well as being modified to operate five to six turbines, for example, that generate power for multiple locations or applications. The system of FIG. 6 can match the number of turbines with an anticipated power requirement, and thus can minimize unnecessary gas compression and vaporization capacity during operations requiring different numbers of turbine generators. Instead of a single turbine being supplied with compressed gas from a single compressor and vaporizer that are together capable of supplying multiple turbines, a single trailer can be employed to meet the demand of a single turbine. While not shown in FIG. 6, a compressor outlet manifold could be included to allow compressor load sharing between the turbines.

The vaporization system 632 can optionally handle liquid fuels, gaseous fuels, and any combination of liquids mixed with gaseous fuels. The vaporization system 632 can also separate the liquids from the gas, vaporize the liquid, then recombine the gaseous fuel with the vaporized fuel and lean-out the mixture with nitrogen rich air to create the correct lower heating value (LHV) and energy density of the new SNG mixture. As shown in FIG. 6, mobile fuel transports (liquid fuel delivery tankers) 603 can provide the liquid fuel supply through manifold 605, and the provided liquid fuel supply can be optionally stored in storage vessel 612. Optionally, liquid fuels can be supplied from a pipeline or alternatively from wet gas or mixed liquid/gaseous fuels.

If required, extra pressure regulation or fuel filtering can be applied to any embodiment. Fuel filtering can include three-phase separators and sand traps for liquid or gaseous fuels, as illustrated in the embodiment shown in FIG. 2. Regulators can be in the form of a specialized unit containing multiple regulators and bypass or isolation valves, such as the pressure regulator skid 220 of FIG. 2, or can be individual regulators 614 spread throughout the compression system. Each piece of equipment can contain dedicated internal pressure regulators.

Valves 610 are optionally provided at the fuel inlets and outlets to each piece of equipment, and further optionally to parts of the internal plumbing to enable fuel to be shut off at any point in the vaporization and compression system. Some of these valves can be manual, while others can be actuated and controlled either digitally or by an automatic control system. Filtration units can also provide heating to the gaseous fuels. In an embodiment, these filtration units can heat the fuel mixture to 50 degrees Fahrenheit above the dew point of the fuel to allow further conditioning of the gas for the turbines and to allow the gas to remain mixed and uncondensed, and to combust properly in the combustion chamber.

In an embodiment, the types of hydrocarbon-, hydrogen-, and alcohol-based fuel gases can be divided into three main categories: (1) gaseous fuels; (2) liquid fuels; (3) and solid fuels. In a non-limiting example of operation, fuel types can be converted to a gaseous state prior to being delivered to the turbines. For liquid fuels the process can include vaporization as described previously. Solid fuels can be converted into a gaseous state by gasification, such as through pyrolysis. One example of pyrolysis can include converting material containing carbon (such as coal or biomass such as peat, wood, or other human waste products) into longer hydrocarbon chains by exposing solid fuel sources to high heat and an oxygen-rich environment, causing the solid fuel sources to partially react or combust. The resulting collected gas—generally referred to as syngas—can be combusted as a fuel source. Syngas, constituents of which include carbon monoxide (CO) or carbon dioxide ($CO_2$) and hydrogen ($H_2$), can be methanized to increase combustibility, which in turn increases the quality and energy of the syngas. Syngas can optionally be converted to methane ($CH_4$) and water ($H_2O$) with a methanation process. Syngas can be obtained from industrial sites and methanized on site using a methanation skid similar in placement to the vaporization equipment. The upgraded syngas can be referred to as SNG and can be supplied to the gas compression system to fuel the turbines.

Examples of hydrocarbon fuels that are naturally in a vaporized state include methane, ethane, propane, and butane. Some of these fuels can be easily converted to liquids at different temperatures or pressures. Natural gas is a fuel source that is commonly used to power the turbines. A normal composition of natural gas is approximately 75-95% methane, with the other portion being composed of ethane, nitrogen, propane, carbon dioxide, butane, oxygen, and traces of other hydrocarbons or impurities. The composition of natural gas varies widely based on region (i.e., where it was extracted), depth (i.e., the depth at which it was extracted), and geological maturity (i.e., how long the hydrocarbon had been exposed to heat and pressure underground).

Hydrogen gas can also be used as a fuel source, despite the lack of a carbon atom precluding hydrogen gas from being designated a hydrocarbon. As a fuel source, hydrogen in the form of $H_2$—also called deuterium—is used. Deuterium can also be used in liquid form ($LH_2$) in conjunction with the vaporization skid added to the gas compression and power generation system. Anhydrous ammonia ($NH_3$) in liquid or gas form can also be used as a potential fuel source. Similarly to CNG conversions, $NH_3$ can be used in most internal combustion engines with very little modification.

For the purposes of discussion herein, liquid hydrocarbon fuels can be fuels that are in a liquid state at standard temperature and pressure. Liquid hydrocarbon fuels can also include subcooled gaseous hydrocarbons (sometimes cooled cryogenically), and/or compressed into a liquid form (such as LNG). As described above, liquid hydrocarbon fuels can be vaporized upstream of the turbines. Alcohols such as methanol, ethanol, butanol, and propanol, as well as many others, can also be used as fuel. Alcohol fuels, such as methanol or ethanol alone, can be used in their pure form, or can be burned as a mixture, such as ecalene, which is several different alcohol molecules mixed together.

Alcohol and hydrocarbon mixes can also be utilized. Such mixes include the previously mentioned ethanol-gasoline mixes such as E10 gasohol, E85, and the other variations. Other options for liquid fuel sources can include TEL, known as Tetraethyl lead ($CH_3CH_2)_4Pb$, or leaded gasoline. TEL is an octane booster used in racing fuel and could be vaporized and used to fuel the turbines or to enrich other vaporized or gaseous fuel sources. Some types of fuel gas that can be utilized with the proposed system or with future development can include gaseous fuels, which include: gaseous hydrocarbons, such as natural gas (mostly methane), compressed natural gas (CNG), methane (an example of an alkane hydrocarbon), butyne (an example of an alkyne hydrocarbon), acetylene (an example of an alkene hydrocarbon), ethylene, ethane, biogas (produced by the fermentation of biodegradable materials, such as anaerobic digestions by bacteria) such as landfill gas, digested gas, and renewable natural gas (upgraded biogas), SNG (substitute natural gas or synthetic natural gas) such as BioSNG (SNG made from biomethane produced through anaerobic digestion or gasification and methanation) and methanized or upgraded syngas, and hydrogen gas ($H_2$, deuterium); vaporized liquid fuels such as alcohol or ethanol (an example of a grain derived alcohol), methanol (an example of a cellulose-derived alcohol), and pentanol (an example of a hydrocarbon-derived alcohol), liquid hydrocarbons such as liquefied natural gas (LNG) and liquid petroleum gas (LPG), both of which are alkane hydrocarbons, butane, propane, octane, pentane, hexane, kerosene, fuel oil, naphtha, gasoline, leaded gasoline, diesel, fuel oil, TEL, liquid hydrogen (known as $LH_2$), ammonia ($NH_3$), gasified solid hydrocarbon fuels, such as syngas (also called synthesis gas, producer gas, or town gas, and needs to undergo methanation before it is considered a true hydrocarbon fuel source), water gas (made by passing steam over superheated solid carbon rich fuel), coal gas (including mond gas and coal gas that is a byproduct of the coking process), wood gas (produced from biomass by using pyrolysis), oil shale gas (produced from solid shale by using pyrolysis), and blau gas (derived from waste naphtha).

Another alternative fuel can include dimethyl ether, which is an isomer of ethanol. Ether is a molecule similar to alcohol but with an alkyl group as part of the molecular formula. Ethers are currently being studied as possible future replacements of conventional fuels, and dimethyl ether specifically can be used as a replacement for propane.

An alternative to using an air separator to reduce the oxygen content in the inert gas for regulating and carrying the vaporized fuel can be provided by the turbines. The exhaust from the turbines themselves can be used, or the exhaust from the black start generator (diesel powered standby generator) can be used to lean-out the vaporized fuel mixture. The term "skid" is often used to describe the various pieces of equipment; these units can be skid-mounted, trailerized, or part of a bodyload tractor.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system for fracturing a subterranean formation comprising:
   a plurality of electric pumps fluidly connected to a well associated with the subterranean formation and powered by at least one electric motor, and configured to pump fluid into a wellbore associated with the well at a high pressure so that the fluid passes from the wellbore into the subterranean formation and fractures the subterranean formation;
   at least one turbine generator electrically coupled to the plurality of electric pumps so as to generate electricity for use by the plurality of electric pumps;
   a gas compression system fluidly coupled to the at least one turbine generator so as to provide fuel for use by the at least one turbine generator; and
   at least one of:
   a liquid fuel source; and
   a solid fuel source,
   wherein each of the liquid fuel source and the solid fuel source are configured to supply fuel to the gas compression system after conversion into the gaseous state.

2. The system of claim 1, further comprising a variable frequency drive connected to the at least one electric motor to control the speed of the at least one electric motor.

3. The system of claim 1, wherein each of the liquid fuel source and the solid fuel source comprise at least one of a hydrogen-based, hydrocarbon-based, or alcohol-based fuel source, or any combination thereof.

4. The system of claim 3, wherein the liquid fuel source comprises any of a kerosene, methanol, No. 2 fuel oil, hydrogen, liquefied natural gas (LNG), substitute natural gas (SNG), liquid hydrocarbon, or ammonia fuel source, or any combination thereof.

5. The system of claim 3, wherein the solid fuel source comprises any of a wood gas or coal gas fuel source, or a combination thereof.

6. The system of claim 1, further comprising an inert gas source, wherein an inert gas is provided to regulate the liquid fuel source or the solid fuel source prior to providing fuel for use by the at least one turbine generator.

7. The system of claim 6, wherein the inert gas source comprises at least one of an oxygen-lean or a nitrogen-rich inert gas source, or a combination thereof.

8. The system of claim 1, further comprising:
   at least one filter configured to filter at least one of particulates, water, or condensate, or a combination thereof, from at least one of the liquid fuel source and the solid fuel source.

* * * * *